(12) United States Patent
Jang et al.

(10) Patent No.: US 12,089,252 B2
(45) Date of Patent: Sep. 10, 2024

(54) METHOD AND APPARATUS FOR FILTERING PPDU IN WIRELESS COMMUNICATION SYSTEM

(71) Applicant: LG ELECTRONICS INC., Seoul (KR)

(72) Inventors: Insun Jang, Seoul (KR); Jeongki Kim, Seoul (KR); Jinsoo Choi, Seoul (KR); Dongguk Lim, Seoul (KR); Suhwook Kim, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 375 days.

(21) Appl. No.: 17/609,609

(22) PCT Filed: May 4, 2020

(86) PCT No.: PCT/KR2020/005867
§ 371 (c)(1),
(2) Date: Nov. 8, 2021

(87) PCT Pub. No.: WO2020/231056
PCT Pub. Date: Nov. 19, 2020

(65) Prior Publication Data
US 2022/0232621 A1    Jul. 21, 2022

(30) Foreign Application Priority Data

May 10, 2019  (KR) .......................... 10-2019-0055069
Jul. 11, 2019   (KR) .......................... 10-2019-0084078
Nov. 4, 2019   (KR) .......................... 10-2019-0139704

(51) Int. Cl.
  *H04W 74/00*  (2009.01)
  *H04W 80/00*  (2009.01)
  *H04W 84/12*  (2009.01)

(52) U.S. Cl.
  CPC .......... *H04W 74/006* (2013.01); *H04W 80/00* (2013.01); *H04W 84/12* (2013.01)

(58) Field of Classification Search
  CPC .... H04W 74/006; H04W 80/00; H04W 84/12
  (Continued)

(56) References Cited

U.S. PATENT DOCUMENTS

2019/0037489 A1   1/2019  Wang et al.
2019/0037549 A1   1/2019  Xu et al.
(Continued)

FOREIGN PATENT DOCUMENTS

KR   10-2019-0017995   2/2019

OTHER PUBLICATIONS

International Search Report from PCT/KR2020/005867, dated Jul. 31, 2020.
(Continued)

*Primary Examiner* — Kwang B Yao
*Assistant Examiner* — Syed M Bokhari
(74) *Attorney, Agent, or Firm* — BRYAN CAVE LEIGHTON PAISNER LLP

(57) ABSTRACT

An example according to the present specification relates to a technique for filtering a PPDU in a wireless LAN (WLAN) system. An STA may receive an NGV PPDU including a first control field and a second control field. The STA may filter the NGV PPDU on the basis of the second control field and may defer channel access on the basis of the first control field.

4 Claims, 32 Drawing Sheets

(58) Field of Classification Search
USPC .......................................................... 370/338
See application file for complete search history.

(56) References Cited

U.S. PATENT DOCUMENTS

| | | | |
|---|---|---|---|
| 2019/0268739 A1* | 8/2019 | Cariou ................. | H04L 27/2603 |
| 2019/0280919 A1* | 9/2019 | Sadeghi ................ | H04W 72/04 |
| 2020/0132829 A1* | 4/2020 | Jiang ....................... | H04W 4/40 |
| 2021/0014112 A1* | 1/2021 | Sadeghi .............. | H04L 41/0803 |

OTHER PUBLICATIONS

Lim, Dongguk et al., PHY designs for 11bd. doc, IEEE 802.11-19/332r2, Mar. 14, 2019, see slides 2-16.
Sun, Bo, NGV SG Use Cases (Next Generation V2X Study Group), doc, IEEE 802.11-18-1323/r2, Nov. 15, 2018, see slide 5.

* cited by examiner (a)

(b)

PPDU Format (IEEE 802.11a/g)

HT PPDU Format (IEEE 802.11n)

VHT PPDU Format (IEEE 802.11ac)

FIG. 18

METHOD AND APPARATUS FOR FILTERING PPDU IN WIRELESS COMMUNICATION SYSTEM

This application is the National Stage filing under 35 U.S.C. 371 of International Application No. PCT/KR2020/005867 filed on May 4, 2020, which claims priority to Korean Patent Application Nos. 10-2019-0055069 filed on May 10, 2019; 10-2019-0084078 filed on Jul. 11, 2019 and 10-2019-0139704 filed on Nov. 4, 2019, the contents of which are all hereby incorporated by reference herein in their entirety.

BACKGROUND

Field of the Disclosure

The present specification relates to a technique for filtering a PPDU in a WLAN system, and more particularly, to a method and an apparatus for filtering a PPDU in a WLAN system.

Related Art

Wireless network technologies may include various types of wireless local area networks (WLAN). WLAN may be used for interconnecting neighboring devices by adopting networking protocols that are extensively used. The various technical features that are described in this specification may be applied to a random communication standard, such as Wi-Fi, or more generally, any one of the IEEE 802.11 wireless protocol group.

The present specification either enhances the conventional (or existing) IEEE 802.11p specification or proposes technical characteristics that can be used in a new communication standard. The new communication standard may be a Next Generation V2X (NGV) standard, which is currently being discussed.

Meanwhile, in the IEEE standard, various types or formats of Physical Protocol Data Units (PPDUs) are defined. Transmitting and receiving stations (STA) may be configured to use an auto-detection rule to identify the type/format of the PPDU being transmitted and received.

SUMMARY

For smooth Vehicle-to-Everything (V2X) support in 5.9 GHz band, technology development for Next Generation V2X (NGV) is in progress in consideration of DSRC (802.11p standard) throughput improvement and highspeed support. In the NGV standard (i.e., 802.11bd standard), wide bandwidth (20 MHz) transmission is being considered instead of the conventional 10 MHz transmission to improve 2× throughput. In addition, the NGV standard must support operations such as interoperability/backward compatibility/coexistence with the existing 802.11p standard.

The NGV standard may support various services. Accordingly, the STA supporting the NGV standard (i.e., the NGV STA) should classify (or filter) the PPDU related to the service it can support. A specific operation method for the above technical objects may be required.

An example according to the present specification relates to a method and/or apparatus for filtering NGV PPDUs in a wireless communication system.

An STA according to an example of the present specification may receive an NGV Physical Protocol Data Unit (PPDU). The NGV PPDU may include a first control field and a second control field. The first control field may include first information related to the transmission time of the NGV PPDU, and the second control field may include second information related to the bandwidth of the NGV PPDU.

The STA according to an example of the present specification may filter the NGV PPDU based on the second control field.

The STA according to an example of the present specification may defer channel access based on the first control field.

TECHNICAL EFFECTS OF THE DISCLOSURE

The present specification proposes technical features supporting a situation in which the 5.9 GHz band is used in various WLAN systems (e.g., IEEE 802.11bd systems). Based on various examples of the present specification, throughput improvement and high speed of Dedicated Short Range Communication (DSRC or 802.11p) may be supported for smooth V2X support in the 5.9 GHz band.

Specifically, according to the present specification, the NGV STA may filter out PPDUs not related to the service to be performed in the WLAN system. Therefore, according to an example of the present specification, technical effects in which the NGV STA can filter the unnecessary PPDU without decoding may be achieved. Accordingly, technical effects in which the NGV STA can efficiently operate may be achieved.

BRIEF DESCRIPTION OF THE DRAWINGS

FIG. 18 illustrates an example of a PPDU used in the present specification.

DESCRIPTION OF EXEMPLARY EMBODIMENTS

Figure 1:
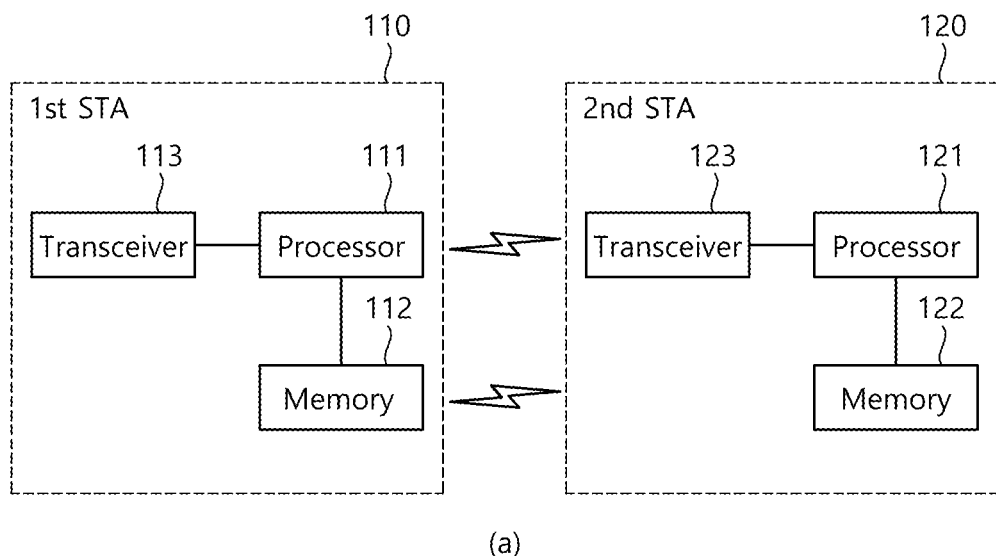
FIG. 1 shows an example of a transmitting apparatus and/or receiving apparatus of the present specification.
Figure 1:
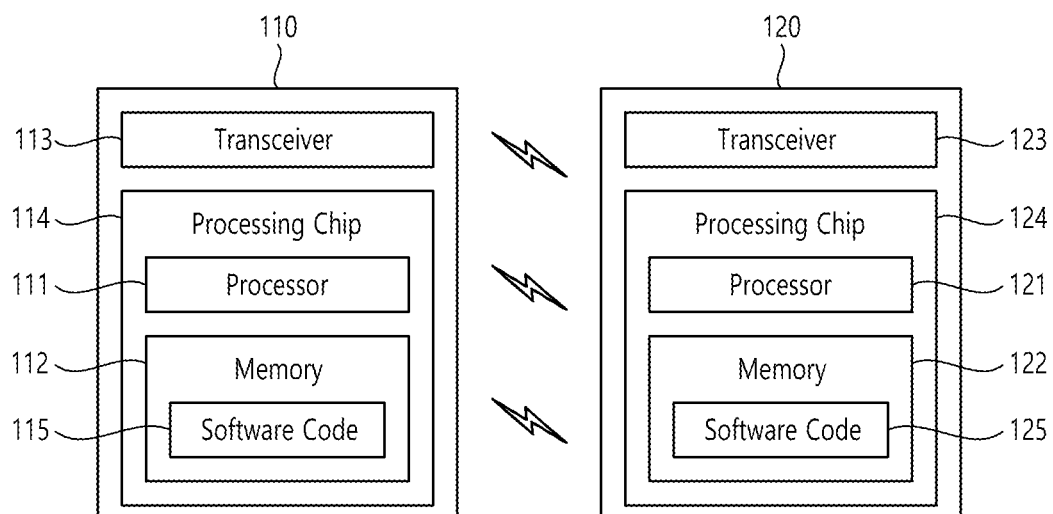

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AN, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
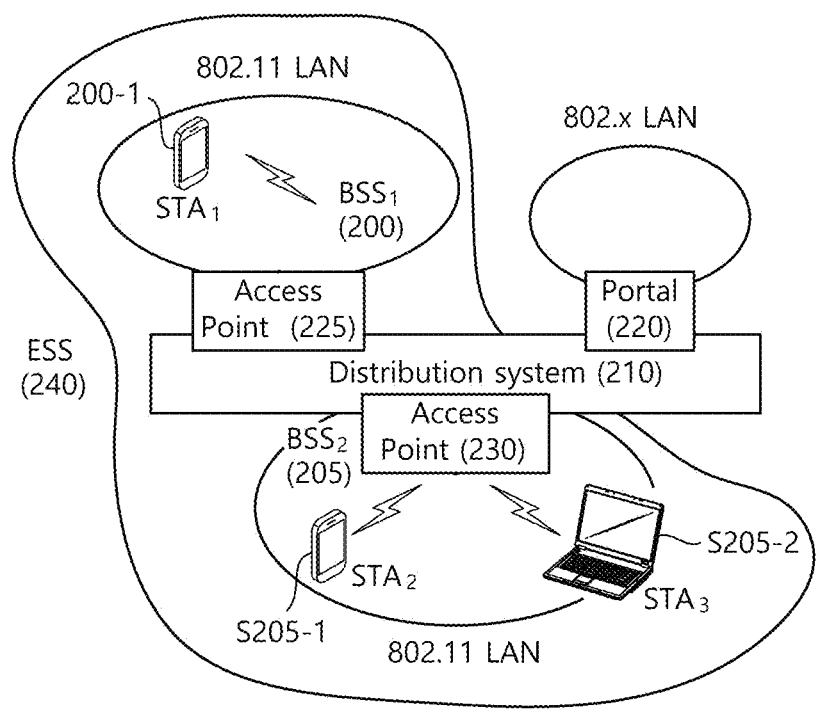
FIG. 2 is a conceptual view illustrating the structure of a wireless local area network (WLAN).
Figure 2:
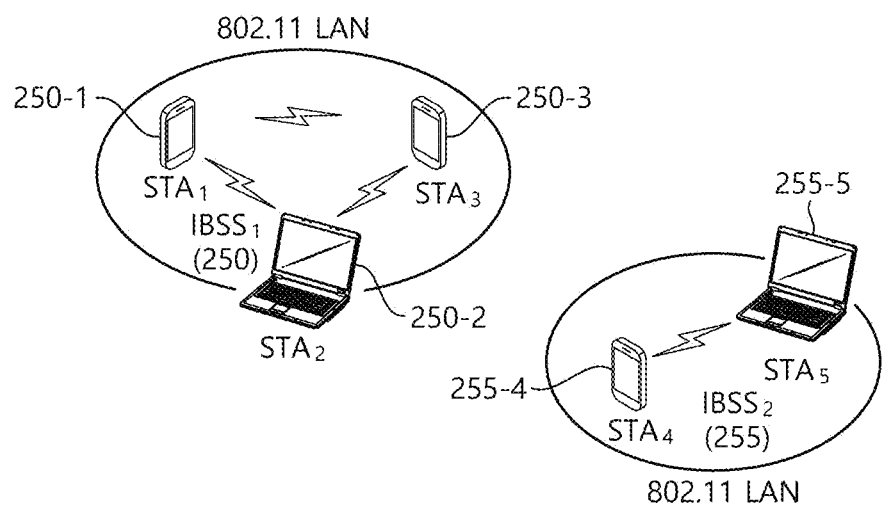

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner In the IBSS, all STAs 250-1, 250-2, 250-3, 255-4, and 255-5 may be constituted by movable STAs and are not permitted to access the DS to constitute a self-contained network.

Figure 3:
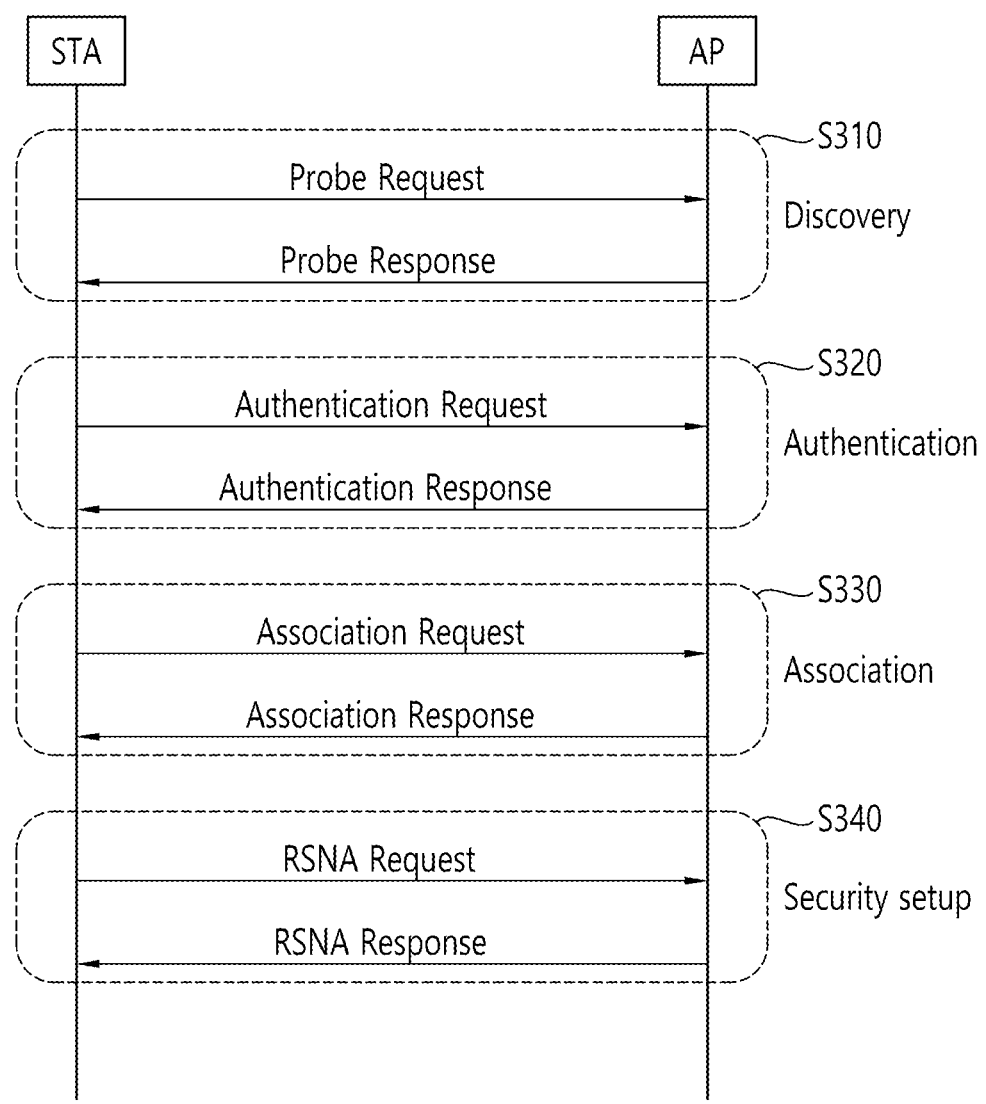
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
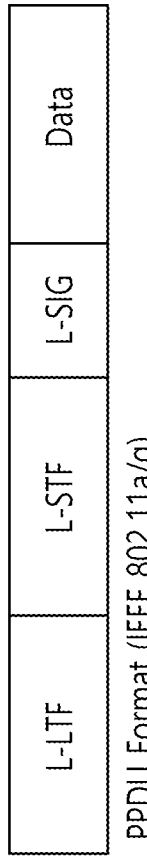
FIG. 4 illustrates an example of a PPDU used in an IEEE standard.
Figure 4:
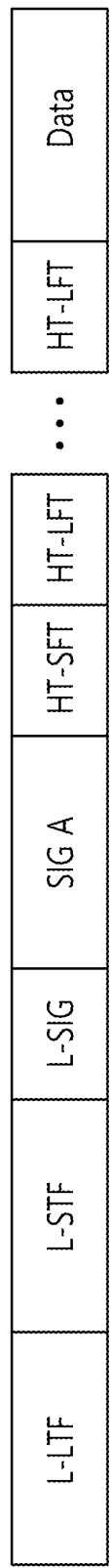
Figure 4:
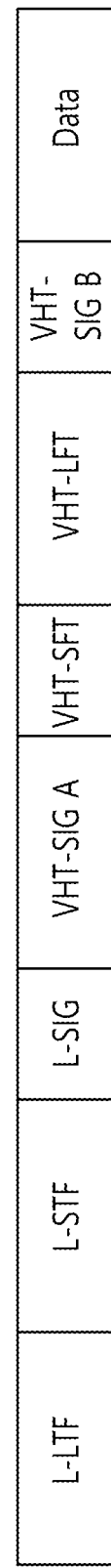
Figure 4:
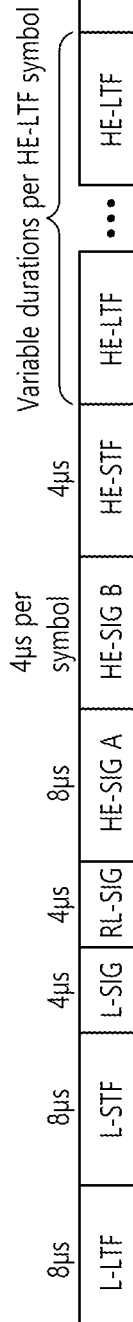

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
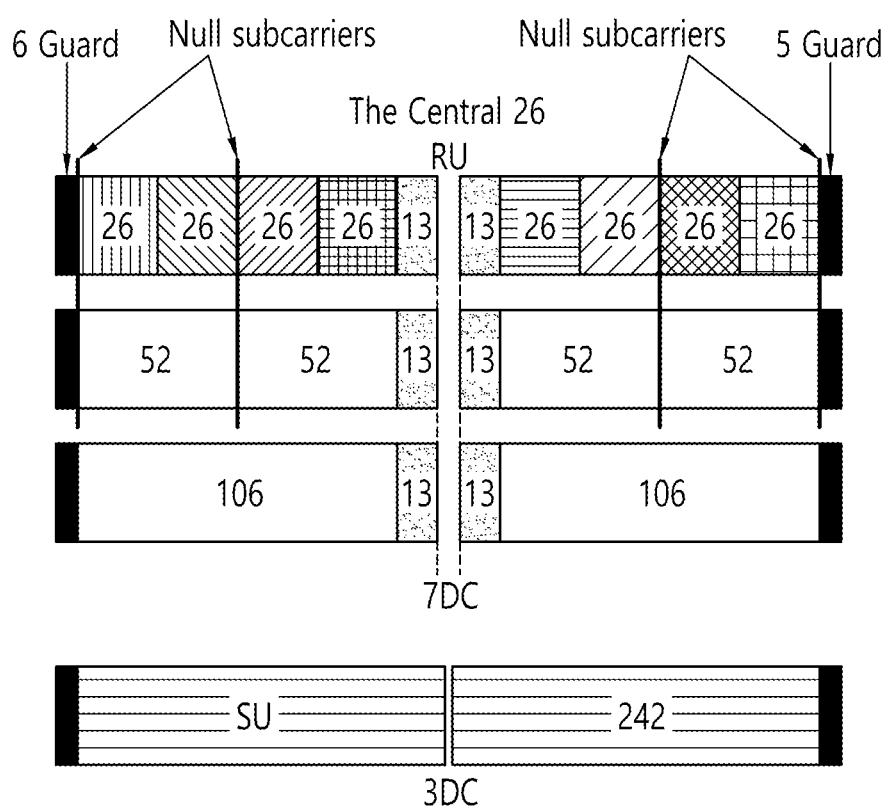
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
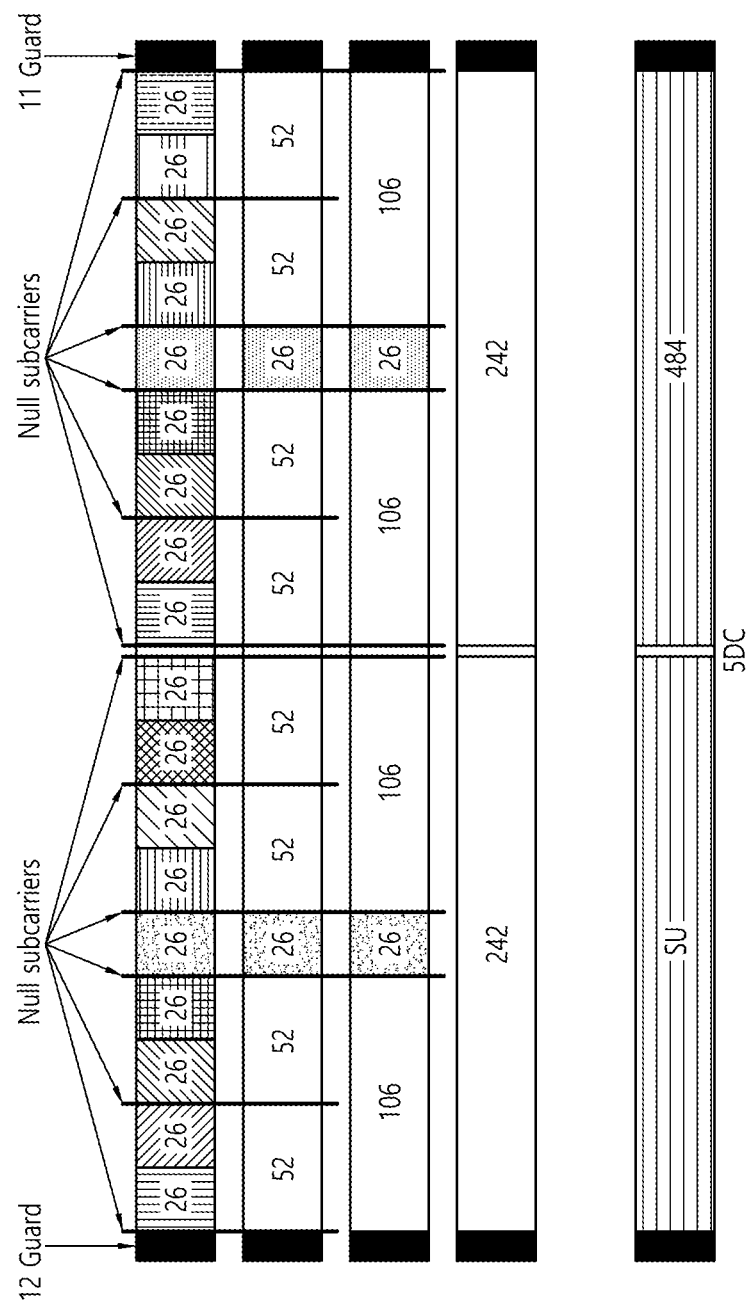
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
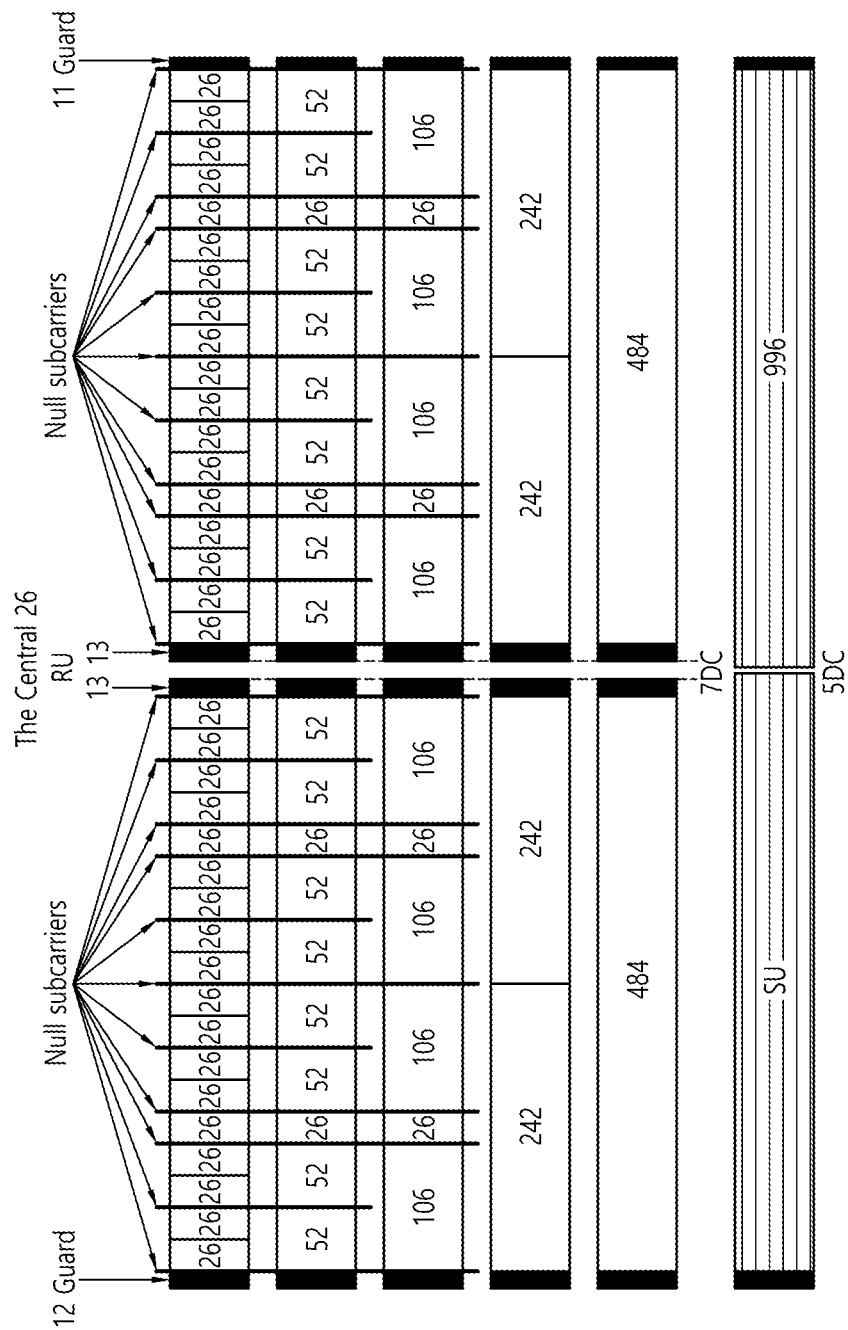
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
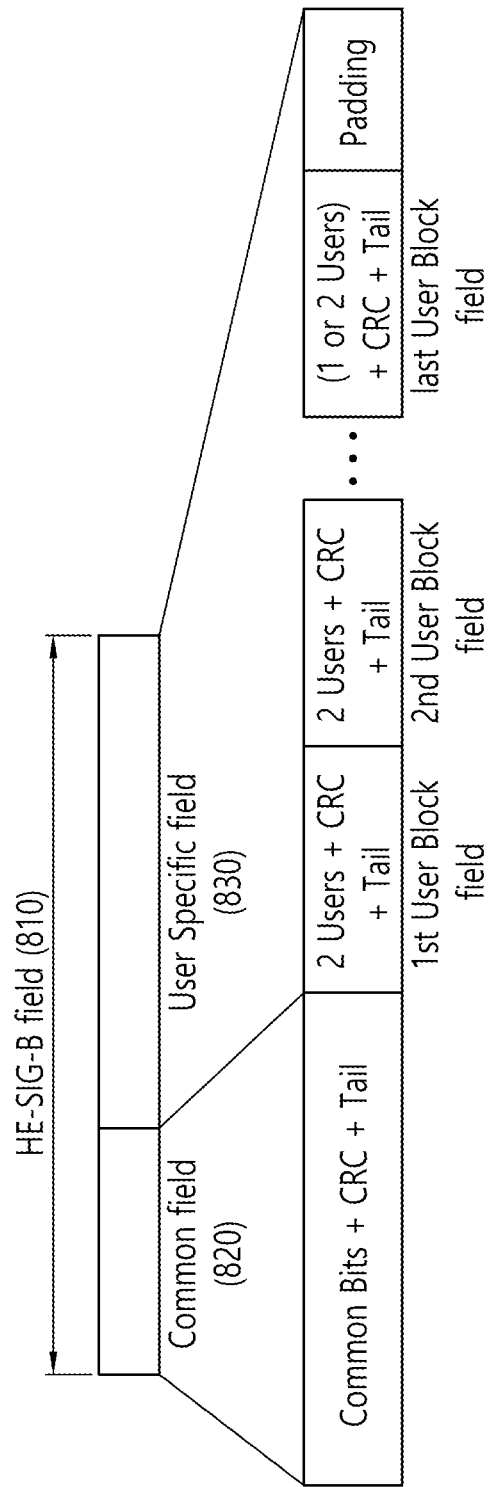
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01000_{y2y1y0}$ | | 106 | | | 26 | 26 | 26 | 26 | 26 | 8 |
| $01001_{y2y1y0}$ | | 106 | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 3 | 0000-0011 | 1-4 | 1 | 1 | | | | | | 3-6 | 13 |
| | 0100-0110 | 2-4 | 2 | 1 | | | | | | 5-7 | |
| | 0111-1000 | 3-4 | 3 | 1 | | | | | | 7-8 | |
| | 1001-1011 | 2-4 | 2 | 2 | | | | | | 6-8 | |
| | 1100 | 3 | 3 | 2 | | | | | | 8 | |
| 4 | 0000-0011 | 1-4 | 1 | 1 | 1 | | | | | 4-7 | 11 |
| | 0100-0110 | 2-4 | 2 | 1 | 1 | | | | | 6-8 | |
| | 0111 | 3 | 3 | 1 | 1 | | | | | 8 | |
| | 1000-1001 | 2-3 | 2 | 2 | 1 | | | | | 7-8 | |
| | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
| | 0100-0101 | 2-3 | 2 | 1 | 1 | 1 | | | | 7-8 | |
| | 0110 | 2 | 2 | 2 | 1 | 1 | | | | 8 | |
| 6 | 0000-0010 | 1-3 | 1 | 1 | 1 | 1 | 1 | | | 6-8 | 4 |
| | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

Figure 9:
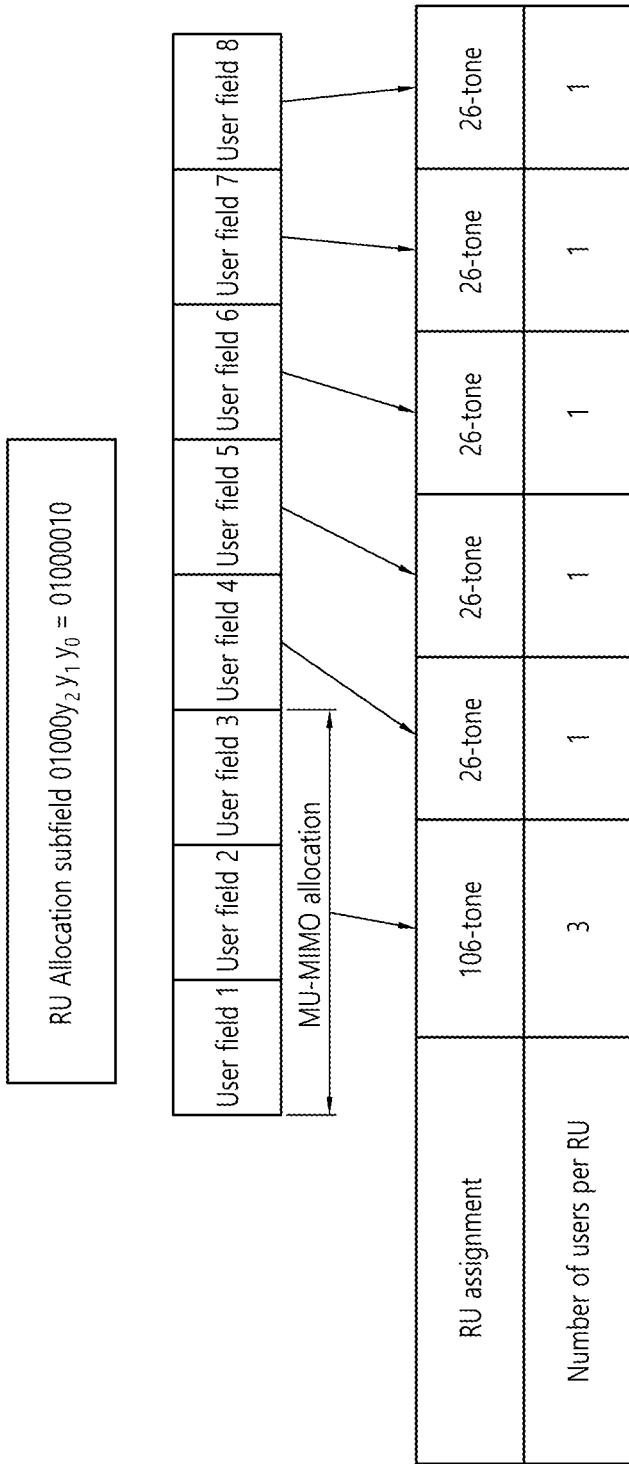
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
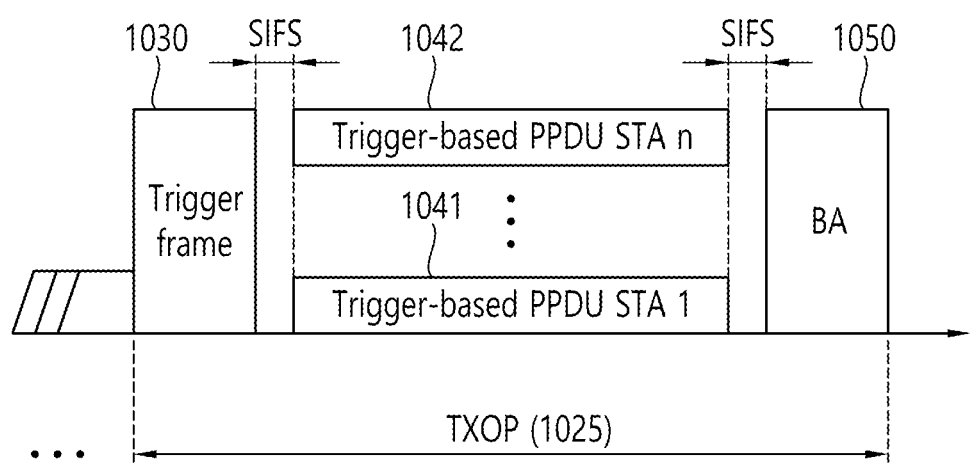
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
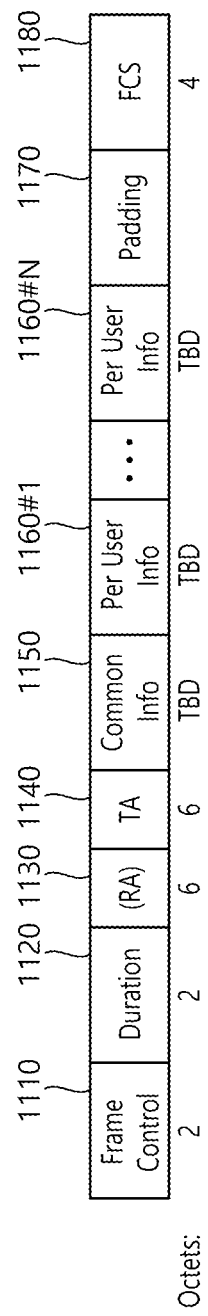
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
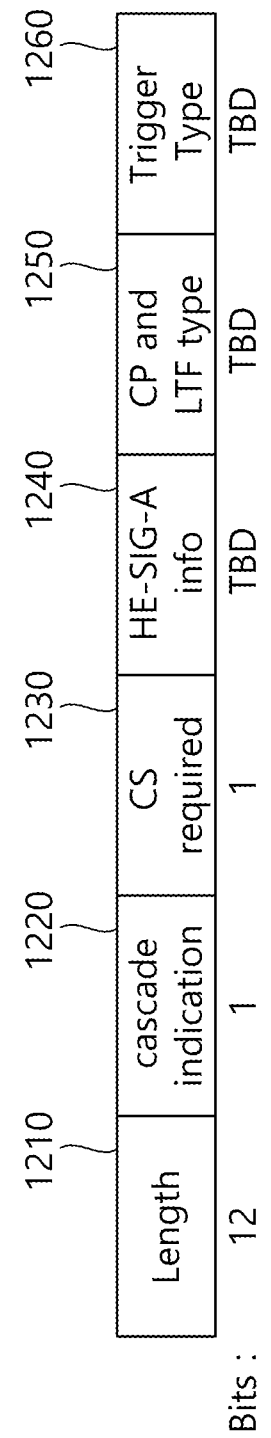
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
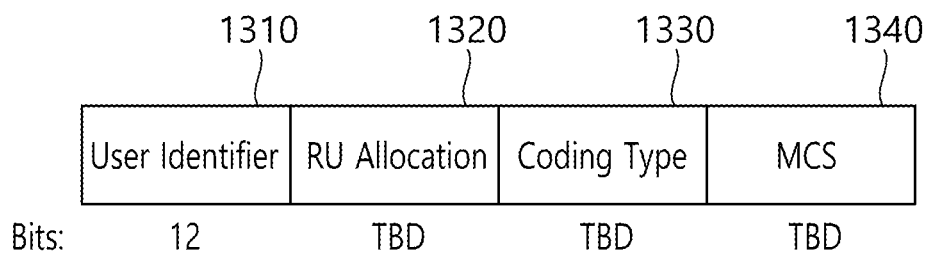
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A sub-field included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
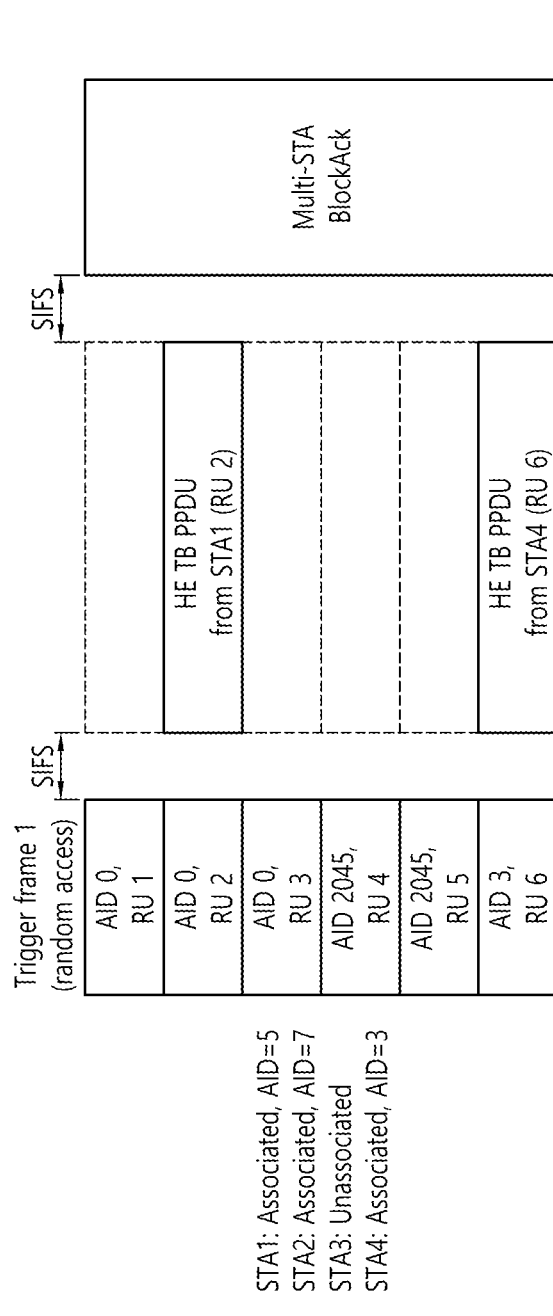
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
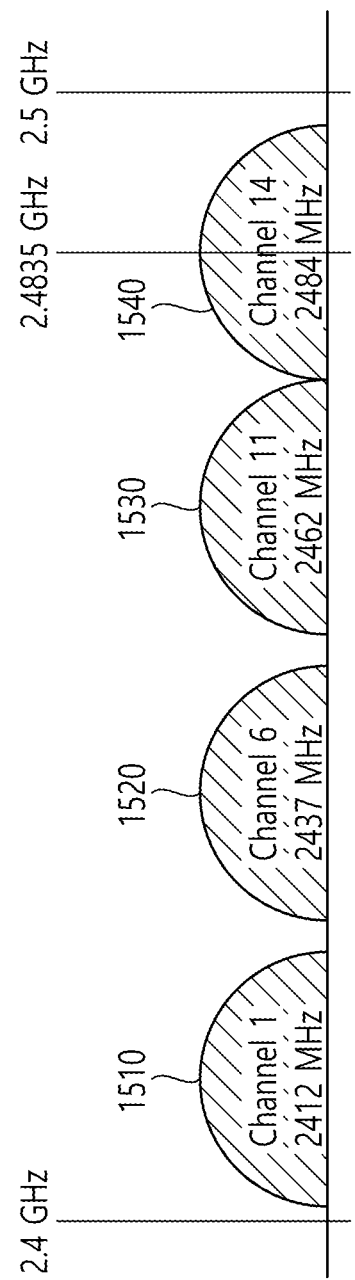
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
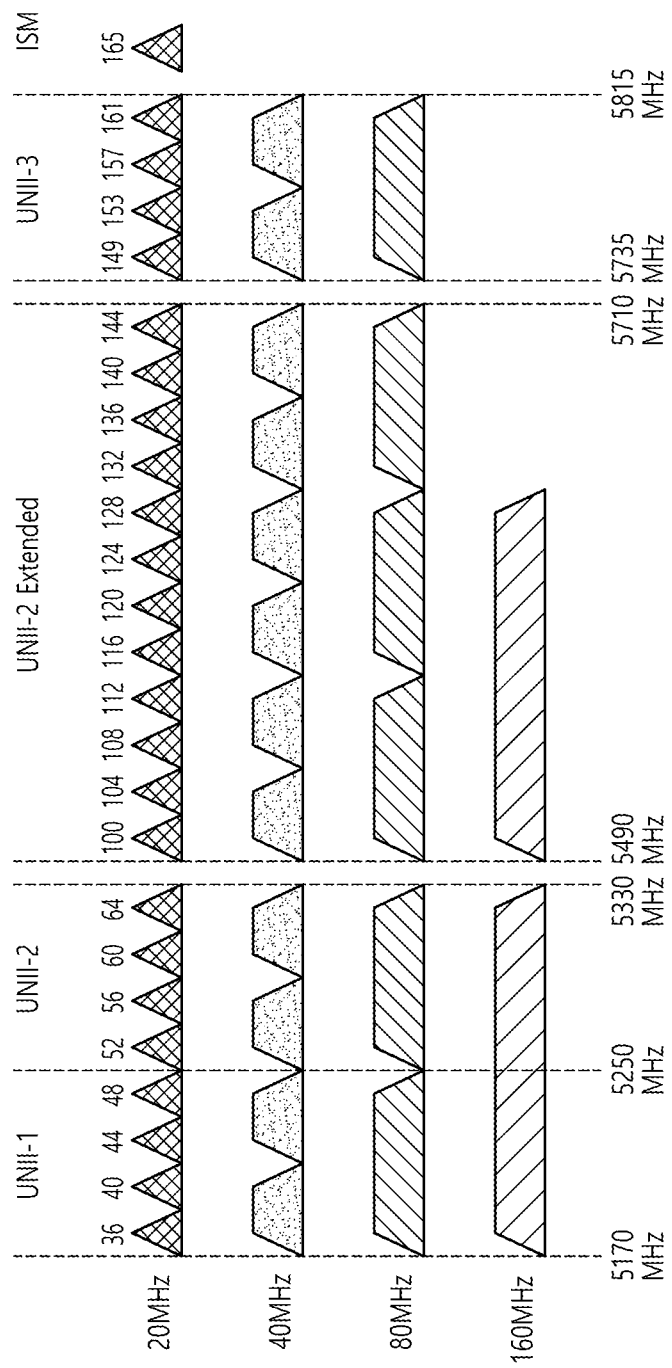
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
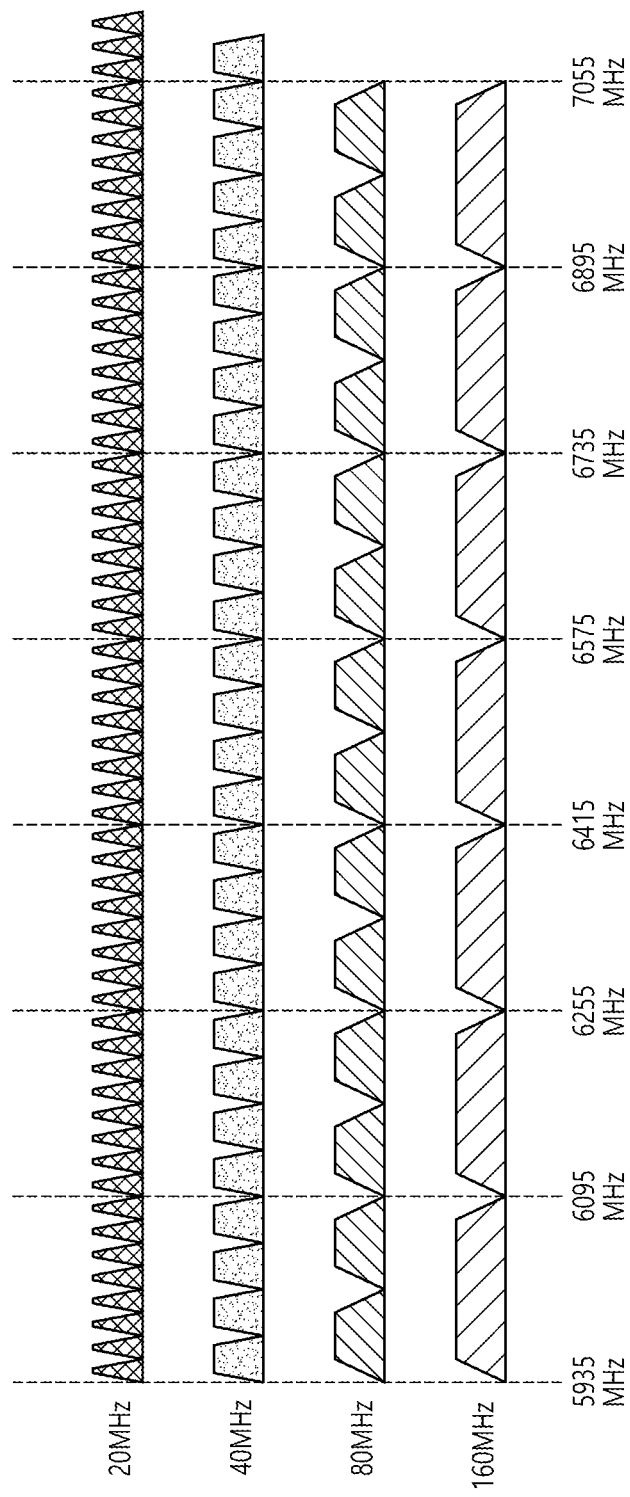
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
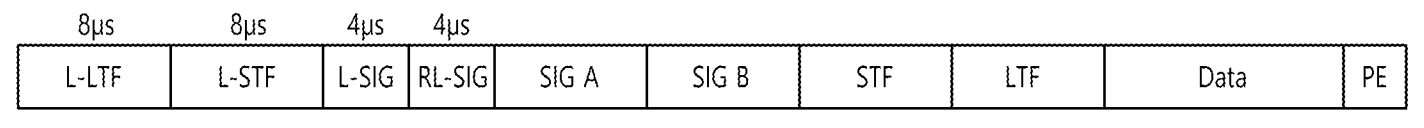

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, a STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After the RL-SIG of FIG. 18, for example, EHT-SIG-A or one control symbol may be inserted. A symbol contiguous to the RL-SIG (i.e., EHT-SIG-A or one control symbol) may include 26 bit information and may further include information for identifying the type of the EHT PPDU. For example, when the EHT PPDU is classified into various types (e.g., an EHT PPDU supporting an SU mode, an EHT PPDU supporting a MU mode, an EHT PPDU related to the Trigger Frame, an EHT PPDU related to an Extended Range transmission, etc.), Information related to the type of the EHT PPDU may be included in a symbol contiguous to the RL-SIG.

A symbol contiguous to the RL-SIG may include, for example, information related to the length of the TXOP and information related to the BSS color ID. For example, the SIG-A field may be contiguous to the symbol contiguous to the RL-SIG (e.g., one control symbol). Alternatively, a symbol contiguous to the RL-SIG may be the SIG-A field.

For example, the SIG-A field may include 1) a DL/UL indicator, 2) a BSS color field which is an identifier of a BSS, 3) a field including information related to the remaining time of a current TXOP duration, 4) a bandwidth field including information related to the bandwidth, 5) a field including information related to an MCS scheme applied to an HE-SIG B, 6) a field including information related to whether a dual subcarrier modulation (DCM) scheme is applied to the HE-SIG B, 7) a field including information related to the number of symbols used for the HE-SIG B, 8) a field including information related to whether the HE-SIG B is generated over the entire band, 9) a field including information related to the type of the LTF/STF, 10) a field indicating the length of the HE-LTF and a CP length.

The SIG-B of FIG. 18 may include the technical features of HE-SIG-B shown in the example of FIGS. 8 to 9 as it is.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 μs, and a periodicity signal of 3.2 μs may be repeated 5 times to become a second type STF having a length of 16 μs. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 μs. In addition, Guard Intervals (GIs) with various lengths (e.g., 0.8/1/6/3.2 μs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may support various bandwidths. For example, the PPDU of FIG. 18 may have a bandwidth of 20/40/80/160/240/320 MHz. For example, at least one field (e.g., STF, LTF, data) of FIG. 18 may be configured based on RUs illustrated in FIGS. 5 to 7, and the like. For example, when there is one receiving STA of the PPDU of FIG. 18, all fields of the PPDU of FIG. 18 may occupy the entire bandwidth. For example, when there are multiple receiving STAs of the PPDU of FIG. 18 (i.e., when MU PPDU is used), some fields (e.g., STF, LTF, data) of FIG. 18 may be configured based on the RUs shown in FIGS. 5 to 7.

For example, the STF, LTF, and data fields for the first receiving STA of the PPDU may be transmitted/received through a first RU, and the STF, LTF, and data fields for the second receiving STA of the PPDU may be transmitted/received through a second RU. In this case, the locations/positions of the first and second RUs may be determined based on FIGS. 5 to 7, and the like.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
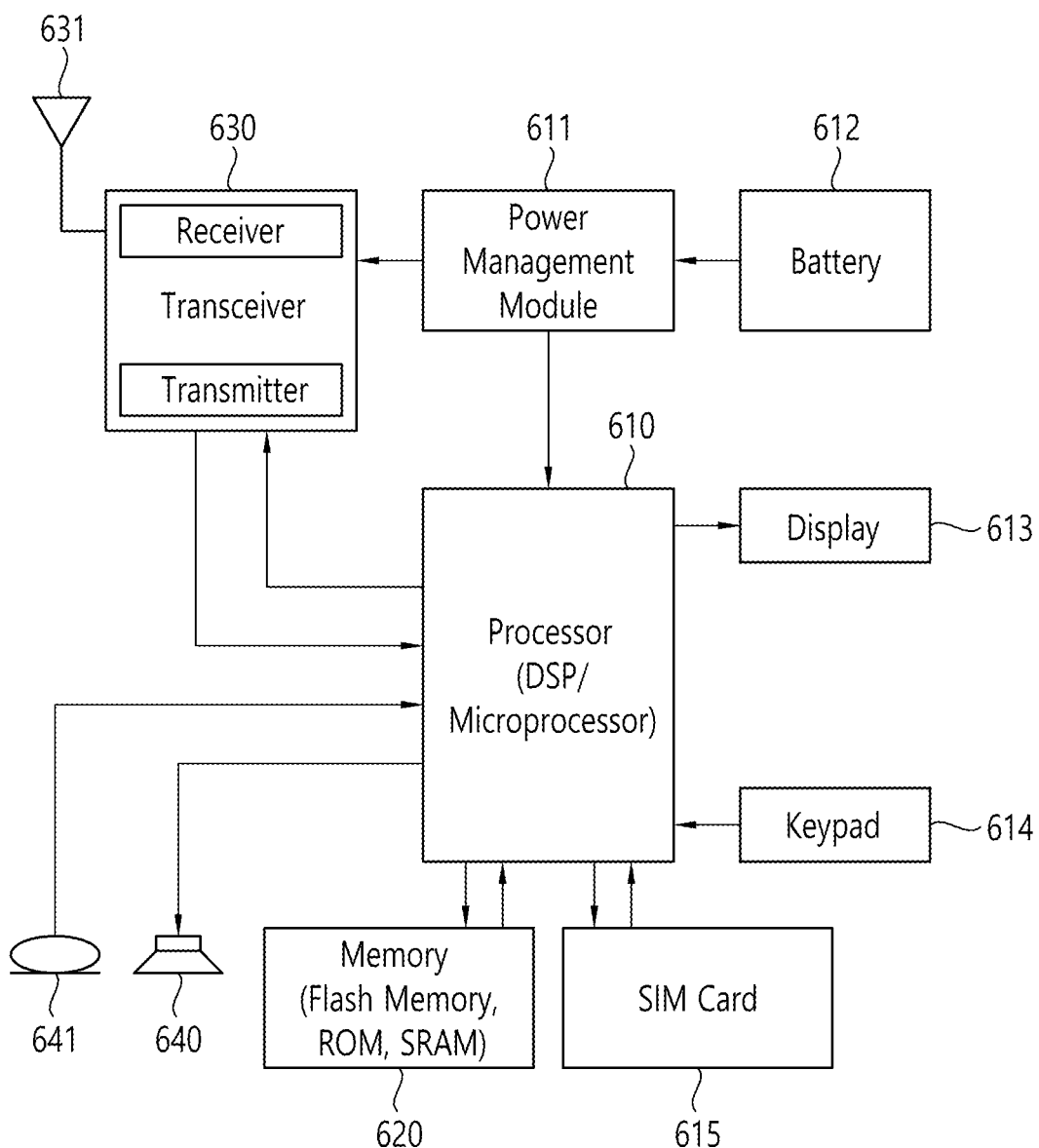
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Figure 20:
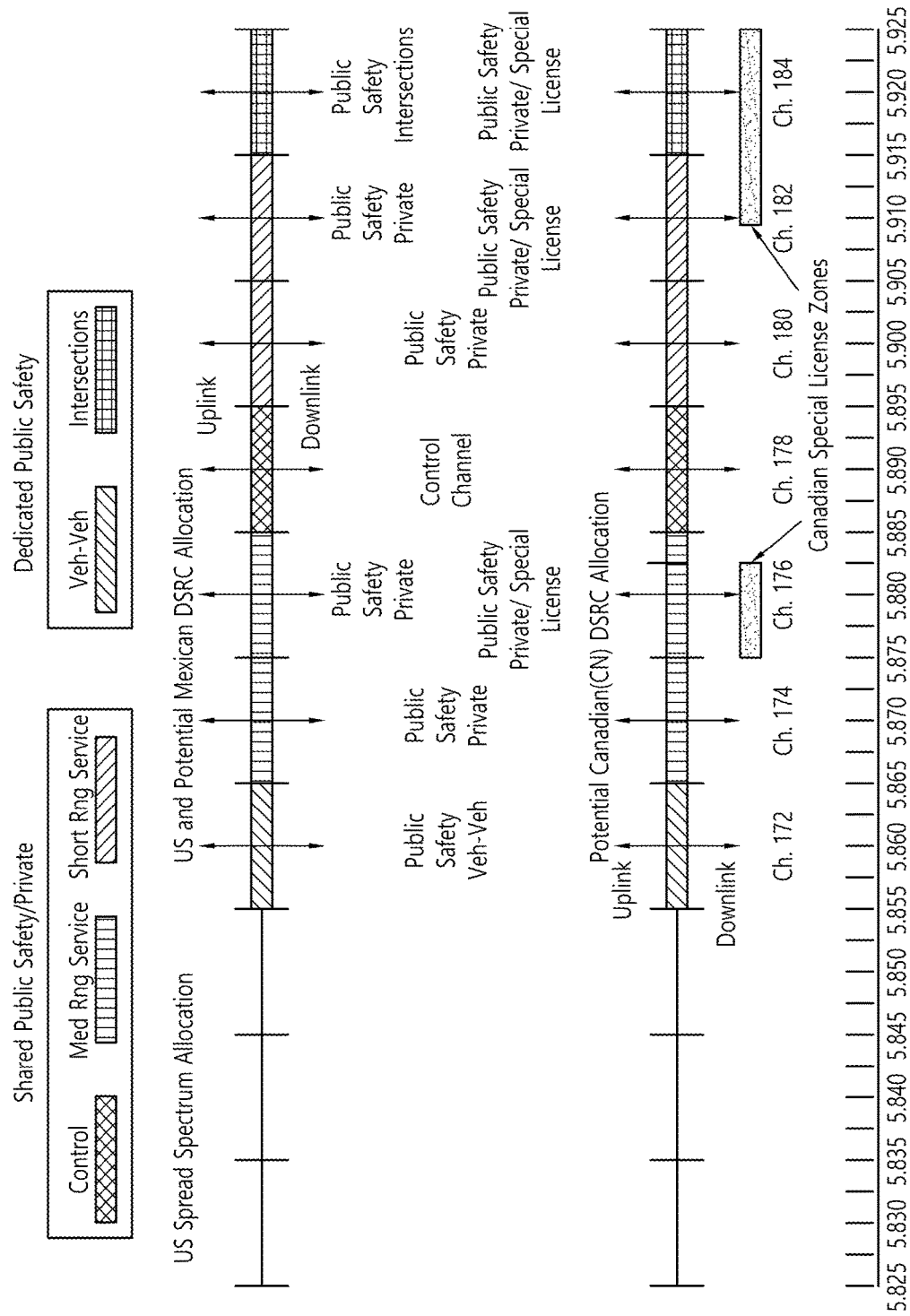
FIG. 20 shows a band plan of 5.9 GHz DSRC.

FIG. 20 shows a band plan of 5.9 GHz DSRC.

5.9 GHz DSRC is a short to medium range communications service that supports both public safety and private operations in roadside-to-vehicle and vehicle-to-vehicle communication environments. DSRC is devised as a complement to cellular communications by providing very high data transfer rates in situations where minimizing latency in the communication link and isolating relatively small communication zones are important. Additionally, PHY and MAC protocols are based on the revision of IEEE 802.11p for wireless access in a vehicular environment (WAVE).

<IEEE 802.11p>

802.11p uses a PHY of 802.11a by performing 2× down-clocking on the PHY. That is, 802.11p transmits a signal by using a 10 MHz bandwidth and not a 20 MHz bandwidth. The numerology comparing 802.11a to 802.11p is as follows.

TABLE 5

| | IEEE 802.11a | IEEE 802.11p |
|---|---|---|
| Symbol deration | 4 us | 8 us |
| Guard period | 0.8 us | 1.6 us |
| Subcarrier spacing | 312.5 KHz | 156.25 KHz |
| OFDM subcarrier | 52 | 52 |
| Number of pilot | 4 | 4 |
| Default BW | 20 MHz | 10 MHz |
| Data rate (Mbps) | 6, 9, 12, 18, 24, 36, 48, 54 Mbps | 3, 4. 5, 6, 9, 12, 18, 24, 27 Mbps |
| Frequency band | 5 GHz ISM | 5.9 GHz dedicated |

Channels of a DSRC band include a control channel and a service channel, and each channel is capable of performing data transmission at 3, 4.5, 6, 9, 12, 18, 24, and 27 Mbps. If an option channel (or optional channel) of 20 MHz exists, transmission at 6, 9, 12, 18, 24, 36, 48, and 54 Mbps may be performed. 6, 9, and 12 Mbps should be supported in all services and channels. And, in case of a control channel, although a preamble is 3 Mbps, the message itself is 6 Mbps. In case channels 174 and 176 and channels 180 and 182 are authorized by a frequency regulation organization, the channel sets may be channels 175 and 181 of 20 MHz, respectively. The remaining channel should be reserved for future usage. A short message or notification data, public safety alarm data, and so on, are broadcasted to all On Board Units (OBUs) through the control channel. The control channel and the service channel have been isolated in order to maximize efficiency and quality of service and to reduce interference between services.

Channel number 178 is a control channel, which automatically performs search and receives notification or data transmission, warning messages, and so on, from a Road Side Unit (RSU). All data of the control channel should be transmitted within 200 ms and is repeated at a pre-defined cycle. In a control channel, public safety warnings have the highest priority over any other private messages. Private messages that are larger than 200 ms are transmitted through a service channel.

Private messages or long public safety messages, and so on, are transmitted through a service channel In order to prevent collision (or conflict), a scheme for detecting channel status (i.e., Carrier Sense Multiple Access (CSMA)) is used prior to the transmission.

Hereinafter, EDCA parameters in an Outside Context of BSS (OCB) mode will be defined. An OCB mode denotes a state where direct communication between nodes can be performed without any procedure of association with an AP. The following shows a basic EDCA parameter set for STA operations, in case dot11OCBActivated is true.

TABLE 6

| AC | CWmin | CWmax | AIFSN | TXOP limit |
|---|---|---|---|---|
| AC_BK | aCWmin | aCWmax | 9 | 0 |
| AC_BE | aCWmin | aCWmax | 6 | 0 |
| AC_VI | (aCWmin + 1)/2 − 1 | aCWmin | 3 | 0 |
| AC_VO | (aCWmin + 1)/4 − 1 | (aCWmin + 1)/2 − 1 | 2 | 0 |

Characteristics of the OCB mode are as follows.
1. In a MAC header, To/From DS fields may be set to '0'.
2. Fields related to Address
    Individual or group destination MAC address may be used.
    A BSSID field may be the same as a wildcard BSSID. (BSSID field=wildcard BSSID)
    In a Data/Management frame, Address 1 may be an RA, Address 2 may be a TA, and Address 3 may be a wildcard BSSID.
3. An authentication process, an association process, or data confidentiality services of the IEEE 802.11 standard may not be used (or utilized).
4. A TXOP limit may be set to '0'.
5. Only a TC (TID) may be used.
6. STAs may not be required to synchronize to a common clock or use such mechanisms.
    STAs may maintain a timing synchronization function (TSF) timer for purposes other than synchronization
7. The STA may send Action frames, and, if the STA maintains a TSF Timer, the STA may transmit Timing Advertisement frames.
8. The STA may send control frames excluding subtype PS-Poll, CF-End, and CF-End +CFAck.

9. The STA may send data frames of subtype Data, Null, QoS Data, and QoS Null.
10. An STA having dot11OCBActivated that is equal to true should not join (or participate in) or start a BSS.

Hereinafter, for example, technical features capable of providing interoperability of a plurality of systems are proposed. For example, the plurality of systems may include a system (IEEE 802.11bd standard) proposed to improve throughput and support high speed for V2X (Vehicle-to-Everything) in the 5.9 GHz band and/or a DSRC system configured based on the existing IEEE 802.11p standard.

Figure 21:
FIG. 21 shows a format of an NGV PPDU for 10 a MHz transmission.
Figure 22:
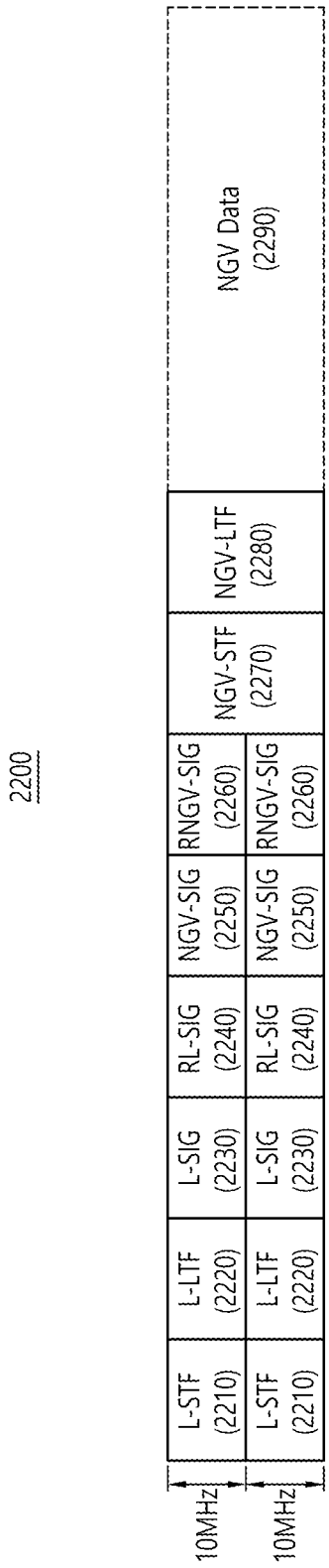
FIG. 22 shows another format of an NGV PPDU for a 20 MHz transmission.

For smooth V2X support in the 5.9 GHz band, NGV technology is being developed in consideration of throughput improvement and high-speed support of the DSRC system. FIGS. 21 to 22 show a frame format (hereinafter, NGV PPDU) according to the IEEE 802.11bd standard.

The NGV PPDU described below may include a preamble, a data field being contiguous to the preamble, and a midamble being contiguous to the data field. In addition, the NGV PPDU may include an additional data field being continuous to the midamble. The number of symbols (or periodicity) of the midamble in the NGV PPDU may be variously configured. For example, the preamble of the NGV PPDU may include L-STF, L-LTF, L-SIG, RL-SIG, NGV-SIG, RNGV-SIG, NGV-STF, and/or NGV-LTF. The NGV midamble may be configured in the same format as the NGV-LTF. The aforementioned L-SIG, RL-SIG, NGV-SIG, and/or RNGV-SIG may be referred to as L-SIG field, RL-SIG field, NGV-SIG field, and/or RNGV-SIG field, respectively.

FIG. 21 shows the format of an NGV PPDU for a 10 MHz transmission.

Referring to FIG. 21, for backward compatibility or interoperability with the IEEE 802.11p standard, the NGV PPDU 2100 may include a field (i.e., L-STF, L-LTF, and/or L-SIG) of a frame (hereinafter, 11p PPDU) being configured based on the IEEE 802.11p standard. For example, the NGV PPDU 2100 may include an L-STF 2110, an L-LTF 2120, or an L-SIG 2130. Additionally, the NGV PPDU may include an RL-SIG 2140, an NGV-SIG 2150, an RNGV-SIG 2160, an NGV-STF 2170, an NGV-LTF 2180, and/or an NGV Data 2190.

The RL-SIG 2140 may be contiguous to the L-SIG 2130. The RL-SIG 2140 may be a field in which the L-SIG 2130 is repeated. In other words, the RL-SIG 2140 may include the same information fields as the L-SIG 2130 and may be modulated (e.g., BPSK) in the same manner as the L-SIG 2130.

The NGV-SIG 2150 may be related to transmission information. For example, the NGV-SIG 2150 may include transmission information. For example, the NGV-SIG 2150 may be 24-bit information. For example, the NGV-SIG 2150 includes information related to a physical layer (PHY) version, information related to a bandwidth, information related to MCS, information related to the number of spatial streams, information related to a midamble periodicity, information related to LTF format, information related to LDPC Extra OFDM Symbol, information related to CRC, and/or information related to a tail bit. BCC encoding based on a coding rate of ½ may be applied to the NGV-SIG 2150.

The RNGV-SIG 2160 may be contiguous to the NGV-SIG 2150. The RNGV-SIG 2160 may be a field in which the NGV-SIG 2150 is repeated. In other words, RNGV-SIG 2160 may include the same information fields as NGV-SIG 2150 and may be modulated in the same manner as NGV-SIG 2150 (e.g., BPSK).

The NGV-STF 2170 may be configured by 2× downclocking a 20 MHz VHT-STF being configured based on the IEEE 802.11ac standard. The NGV-LTF 2180 may be configured by 2× downclocking a 20 MHz VHT-LTF being configured based on the IEEE 802.11ac standard.

The NGV-LTF 2180 may be configured based on at least one LTF format. For example, the NGV-LTF 2180 may be configured based on one of NGV-LTF-1× format, NGV-LTF-2× format, or repeated NGV-LTF-2× format. Information related to the LTF format used for the NGV-LTF 2180 may be included in the NGV-SIG 2150.

For example, the NGV-LTF-2× format may be set as a default format. As another example, the NGV-LTF-1× format may be used for high-efficiency transmission of one spatial stream (SS). As another example, the repeated NGV-LTF-2× format may be used for extended range (ER) transmissions. The repeated NGV-LTF-2× format can be configured by repeating a symbol of the NGV-LTF-2× format excluding a pre-append 1.6 μs duration which includes one cyclic prefix (CP) and guard interval (GI). The repeated NGV-LTF-2× format may be used when dual carrier modulation (DCM) and BPSK modulation are applied to the NGV data 2190. For example, when the DCM and BPSK modulation are applied to the NGV data 2190, the repeated NGV-LTF-2× format may be may be used/applied to the NGV-LTF 2280 regardless of information related to the LTF format included in the NGV-SIG 2150.

For example, in a 10 MHz transmission, a sequence of the NGV-LTF-1× format may be configured as shown in Equation 1.

$$\text{NGV-LTF-1×sequence} = [1, 0, 1, 0, -1, 0, 1, 0, -1, 0,\\ -1, 0, 1, 0, 1, 0, 1, 0, -1, 0, 1, 0, 1, 0, 1, 0, 1,\\ 0, 0, 0, -1, 0, 1, 0, -1, 0, -1, 0, -1, 0, -1, 0,\\ -1, 0, 1, 0, -1, 0, -1, 0, -1, 0, 1, 1, 1]$$ [Equation 1]

For example, in a 10 MHz transmission, a sequence of the NGV-LTF-2× format may be configured as shown in Equation (2).

$$\text{NGV-LTF-2×sequence} = [1, 1, \text{LTF\_left}, 0, \text{LTF\_right},\\ -1, -1]$$ [Equation 2]

In Equation 2, LTF_left and LTF_right may be configured as shown in Equation 3.

$$\text{LTF\_left} = [1, 1, -1, -1, 1, -1, 1, -1, 1, 1, 1, 1,\\ -1, -1, 1, -1, 1, -1, 1, 1, 1, 1]$$

$$\text{LTF\_right} = [1, -1, -1, 1, 1, -1, 1, -1, 1, -1, -1, -1,\\ -1, -1, 1, 1, -1, -1, 1, -1, 1, -1, 1, 1, 1, 1]$$ [Equation 3]

The NGV data 2190 may include a service field, PHY pad bits, and/or PSDU.

Although not shown, the NGV PPDU 2100 may include a midamble being continuous to the NGV data 2190. Also, the NGV PPDU 2100 may include an additional data field being continuous to the midamble.

The midamble may be used to perform additional channel estimation. That is, the midamble has an effect of reducing the effect of Doppler shift.

The midamble may be inserted/configured in the NGV PPDU 2100 at a specified period. Information related to the designated period may be included in the NGV-SIG 2150. For example, the NGV-SIG 2150 may include information related to a midamble periodicity. The midamble periodicity may be set to one of 4, 8, or 16. For example, when the midamble periodicity is set to 4, the NGV PPDU 2100 may include a midamble every 4 data symbols.

The midamble may be configured in the same format as the NGV-LTF 2180. For example, the midamble may be set to one of the NGV-LTF-1× format, the NGV-LTF-2× format, or the repeated NGV-LTF-2× format. Information related to the LTF format used for the midamble may be included in the NGV-SIG 2150.

FIG. 22 shows another format of an NGV PPDU for a 20 MHz transmission.

Referring to FIG. 22, the NGV PPDU 2200 may be configured to have a 20 MHz bandwidth. The NGV PPDU 2200 may include an L-STF 2210, an L-LTF 2220, an L-SIG 2230, an RL-SIG 2240, an NGV-SIG 2250, an RNGV-SIG 2260, an NGV-STF 2270, an NGV-LTF 2280, and/or NGV Data 2290.

The L-STF 2210, the L-LTF 2220, or the L-SIG 2230 may be configured by being duplicated in units of 10 MHz. The L-STF 2210, the L-LTF 2220, or the L-SIG 2230 may be related to the L-STF 2110, the L-LTF 2120, or the L-SIG 2130 of FIG. 21.

According to an embodiment, the RL-SIG 2240, the NGV-SIG 2250, or the RNGV-SIG 2260 may also be configured to be duplicated in units of 10 MHz. The RL-SIG 2240, NGV-SIG 2250, or RNGV-SIG 2260 may be related to the RL-SIG 2140, NGV-SIG 2150, or RNGV-SIG 2160 of FIG. 21.

The NGV-STF 2270 may be configured by 2× downclocking a 40 MHz VHT-STF being configured based on the IEEE 802.11ac standard. The NGV-LTF 2280 may be configured by 2× downclocking a 40 MHz VHT-LTF being configured based on the IEEE 802.11ac standard.

The NGV-LTF 2280 may be configured based on at least one format. For example, the NGV-LTF 2180 may be set to one of the NGV-LTF-1× format, the NGV-LTF-2× format, or the repeated NGV-LTF-2× format.

For example, in a 20 MHz transmission, a sequence of the NGV-LTF-1× format may be configured as shown in Equation 4.

NGV-13F-1×sequence=[1, 0, −1, 0, 1, 0, −1, 0, −1,
 0, 1, 0, 1, 0, 1, 0, −1, 0, 1, 0, 1, 0, 1, 0, 1, 0, 1,
 0, −1, 0, 1, 0, −1, 0, −1, 0, −1, 0, −1, 0, −1, 0,
 1, 0, −1, 0, −1, 0, 1, 0, 1, 0, −1, 0, 1, 0, 0, 0,
 −1, 0, 1, 0, 1, 0, −1, 0, 1, 0, −1, 0, −1, 0, 1, 0,
 1, 0, 1, 0, −1, 0, 1, 0, 1, 0, 1, 0, 1, 0, 1, 0, −1,
 0, 1, 0, −1, 0, −1, 0,−1, 0 −1, 0, −1, 0, 1, 0, −1,
 0, −1, 0, −1, 0, 1, 0, 1]  [Equation 4]

For example, in a 20 MHz transmission, a sequence of the NGV-LTF-2× format may be configured as shown in Equation 5.

NGV-LTF-1×sequence=[LTF_left 1, LTF_right −1,
 −1, −1, 1, 0, 0, 0, −1, 1, 1, −1, LTF_left, 1,
 LTF_right]  [Equation 5]

In Equation 5, LTF_left and LTF_right may refer to Equation 3.

The NGV data 2290 may include a service field, PHY pad bits, and/or PSDU. The NGV data 2290 may be related to the NGV data 2190 of FIG. 21.

Although not shown, similar to the NGV PPDU 2100 of FIG. 21, the NGV PPDU 2200 may include a midamble being continuous to the NGV data 2290. Also, the NGV PPDU 2200 may include an additional data field being continuous to the midamble.

An example of the present specification relates to an NGV PPDU (or 11bd PPDU). The NGV PPDU may be used in various wireless communication systems, for example, in an IEEE 802.11bd wireless LAN system.

The NGV PPDU may be referred to as various names/terminologies. For example, the NGV PPDU may be referred to as an NGV frame, an 11bd frame, an 11bd PPDU, or the like. Also, for another example, the NGV PPDU may be referred to by various names such as a first type PPDU, a transmission PPDU, a reception PPDU, and a WLAN PPDU. Hereinafter, for convenience of description, a frame of the IEEE 802.11bd standard may be referred to as the NGV PPDU. In addition, a PPDU according to the IEEE 802.11p standard may be referred to as the 11p PPDU.

Similarly, an STA supporting the IEEE 802.11bd standard may be referred to by various names. For example, an STA supporting the IEEE 802.11bd standard may be referred to as an 11 bd STA, an NGV STA, a transmitting STA, or a receiving STA. Hereinafter, for convenience of description, an STA supporting the IEEE 802.11bd standard may be referred to as an NGV STA. In addition, an STA supporting the IEEE 802.11p standard may be referred to as an 11p STA. In addition, the 5.9 GHz band may be variously expressed as an NGV band, a reception band, a transmission band, and the like.

According to the next-generation V2X communication (e.g., NGV or 802.11bd standard), a 20 MHz transmission may be supported. For example, a device according to the 802.11bd standard (hereinafter, NGV STA) may transmit an NGV PPDU configured with a bandwidth of 20 MHz. That is, the NGV PPDU may be transmitted with a bandwidth of 20 MHz. In addition, the NGV STA may transmit an NGV PPDU configured with a 10 MHz bandwidth. That is, the NGV PPDU may be transmitted with a bandwidth of 10 MHz. In other words, the NGV PPDU may be configured with a bandwidth of 10 MHz or a bandwidth of 20 MHz.

According to an embodiment, the NGV STA may perform channel access using a 10 MHz primary channel for a 20 MHz transmission. The NGV STA operating in the 20 MHz channel may receive a PPDU related to a service different from the service to be performed by the NGV STA through the 10 MHz primary channel. When the NGV STA receives the PPDU, it may not receive an intended PPDU related to the service to be performed by the NGV STA due to unnecessary PPDU reception. Therefore, in the present specification, a method of filtering PPDUs not related to a service to be performed by an NGV STA may be proposed.

Specifically, an embodiment (or method) of filtering a PPDU based on bandwidth information and an embodiment (or method) of filtering a PPDU based on service information may be described below.

1. An Embodiment of Filtering PPDUs Based on Bandwidth Information

The NGV STA may use bandwidth information to filter a PPDU other than a PPDU related to a service to be performed (or its own service). According to an embodiment, the NGV STA may receive an NGV PPDU or an 11p PPDU. The NGV STA may filter the PPDU in a different way when receiving the NGV PPDU and when receiving the 11p PPDU.

(1) When the NGV STA Receives the NGV PPDU

According to an embodiment, the NGV STA may receive the NGV PPDU. For example, the NGV PPDU may include a first control field and a second control field. As an example, the first control field may include information related to transmission time of the NGV PPDU. The first control field may include an L-SIG (or an L-SIG field). As an example, the second control field may include information related to a bandwidth of the NGV PPDU. The second control field may include an NGV-SIG (or NGV-SIG field).

According to an embodiment, the NGV STA may filter the NGV PPDU based on the second control field. For example, the NGV STA may filter the NGV PPDU based on information related to the bandwidth of the NGV PPDU included in the second control field.

For example, the NGV STA may receive/obtain information indicating that it should perform a service through a 20 MHz bandwidth from an upper layer. In other words, the NGV STA may need to transmit and receive a PPDU of 20 MHz. The NGV STA may confirm/check that the bandwidth of a received NGV PPDU is set to 10 MHz based on the information related to the bandwidth of the NGV PPDU. Accordingly, the NGV STA may filter the received NGV PPDU.

As another example, the NGV STA may receive information indicating that it should perform a service through a 10 MHz bandwidth from an upper layer. In other words, the NGV STA may need to transmit and receive a PPDU of 10 MHz. The NGV STA may confirm/check that the bandwidth of a received NGV PPDU is set to 20 MHz based on the information related to the bandwidth of the NGV PPDU. Accordingly, the NGV STA may filter the received NGV PPDU.

According to an embodiment, the NGV STA may defer channel access based on the first control field. For example, the NGV STA may defer channel access based on information related to transmission time of the NGV PPDU included in the first control field.

For example, the first control field may include a length field and a rate field. That is, the NGV STA may obtain information related to the transmission time of the NGV PPDU based on the length field and the rate field.

Hereinafter, a detailed operation of the NGV STA related to the above-described embodiment may be described.

The NGV STA may be instructed to perform an operation (or service) in a 20 MHz bandwidth from an upper layer. That is, the NGV STA may be instructed to transmit/receive an NGV PPDU having a 20 MHz bandwidth from an upper layer. Thereafter, the NGV STA may receive the NGV PPDU. In other words, the NGV STA may receive information indicating that a service is to be performed through a designated bandwidth (e.g., 20 MHz) from a higher layer. Accordingly, the NGV STA may perform a service only through the designated bandwidth. That is, the NGV STA can transmit and receive only the NGV PPDU of the designated bandwidth.

The NGV STA operating in the 20 MHz bandwidth may compare information related to the received NGV PPDU bandwidth with the 20 MHz bandwidth indicated by the upper layer. The NGV STA may determine whether to filter the received NGV PPDU based on the comparison result.

For example, if the bandwidth information indicates 20 MHz, the NGV STA may decode the received NGV PPDU. In other words, the NGV STA may confirm/check that the received NGV PPDU is configured with a bandwidth of 20 MHz, based on information related to the bandwidth of the received NGV PPDU. Accordingly, the NGV STA may continue to decode the received NGV PPDU.

As another example, if bandwidth information indicates 10 MHz, the NGV STA may filter the received NGV PPDU. In other words, the NGV STA may confirm/check that the NGV PPDU is configured with a bandwidth of 10 MHz, based on information related to the bandwidth of the received NGV PPDU. Accordingly, the NGV STA may filter the received NGV PPDU.

According to an embodiment, if information related to the bandwidth of the NGV PPDU that the NGV STA is receiving through the 10 MHz primary channel is indicated as 10 MHz, the NGV STA may stop decoding the NGV PPDU being received. The NGV STA may filter the NGV PPDU being received. In this case, the NGV STA may defer channel access by the transmission time of the NGV PPDU that the NGV STA is receiving, based on information (e.g., length or rate) included in the L-SIG of the received NGV PPDU.

For example, when the NGV PPDU is configured with a bandwidth of 10 MHz, the NGV STA may stop decoding the NGV PPDU being received. The NGV STA may filter the NGV PPDU being received. The NGV STA may delay channel access by the transmission time of the NGV PPDU. As an example, the NGV PPDU may include an L-SIG. The L-SIG may include a length field and a rate field. The NGV STA may check the transmission time of the NGV PPDU based on a length field and a rate field. Accordingly, the NGV STA may delay channel access until the transmission of the NGV PPDU is finished.

According to an embodiment, at least a part of the NGV PPDU of the 20 MHz bandwidth may be configured by being duplicated in units of 10 MHz. Accordingly, the NGV STA may receive at least a portion of the NGV PPDU of the 10 MHz/20 MHz bandwidth through only the 10 MHz primary channel. The NGV STA may obtain/identify information related to the bandwidth of the NGV PPDU based on at least a part of the NGV PPDU. In other words, the NGV STA may first receive at least a part of the NGV PPDU and perform decoding. The NGV STA may obtain/identify information related to the bandwidth of the NGV PPDU by decoding at least a part of the NGV PPDU.

The NGV STA may again perform a PHY (or physical layer) procedure for receiving (or detecting or decoding) a new NGV PPDU. For example, the NGV STA may perform a Clear Channel Assessment-Signal Detection (CCA-SD) procedure again. The CCA-SD procedure may be a procedure for detecting the start of a PPDU occupying a 10 MHz primary channel.

According to the above-described embodiment, there is an effect that the NGV STA can perform decoding on only the preamble (e.g., L-SIG, NGV-SIG) and filter the received NGV PPDU. That is, the NGV STA may skip decoding the data field of the NGV PPDU not related to the service to be performed. Accordingly, there is an effect that the NGV STA can operate efficiently.

Figure 25:
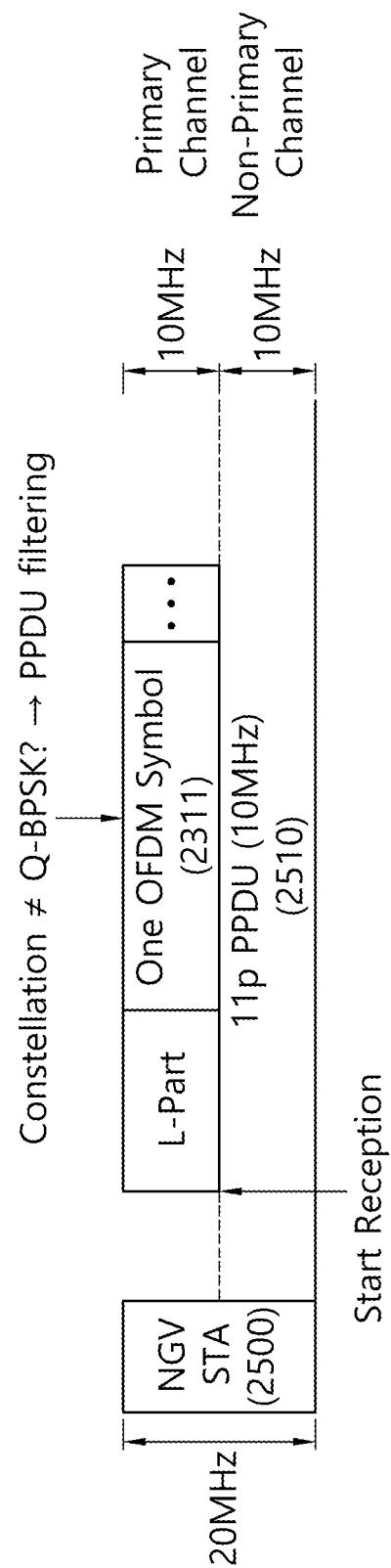
FIG. 25 shows a diagram for explaining an example in which an 11p PPDU is filtered.

The NGV STA may perform the steps shown in FIG. 25 when filtering the NGV PPDU. A detailed description of the steps shown in FIG. 25 may be described later.

Bandwidth information may be indicated through the NGV PPDU. For example, information related to the bandwidth may be indicated through the NGV SIG and/or L-SIG of the NGV PPDU. In other words, bandwidth information may be included in the NGV PPDU. For example, the bandwidth information may be included in the NGV SIG and/or the L-SIG. An embodiment related thereto may be described with reference to FIGS. 23 and/or 24.

Figure 23:
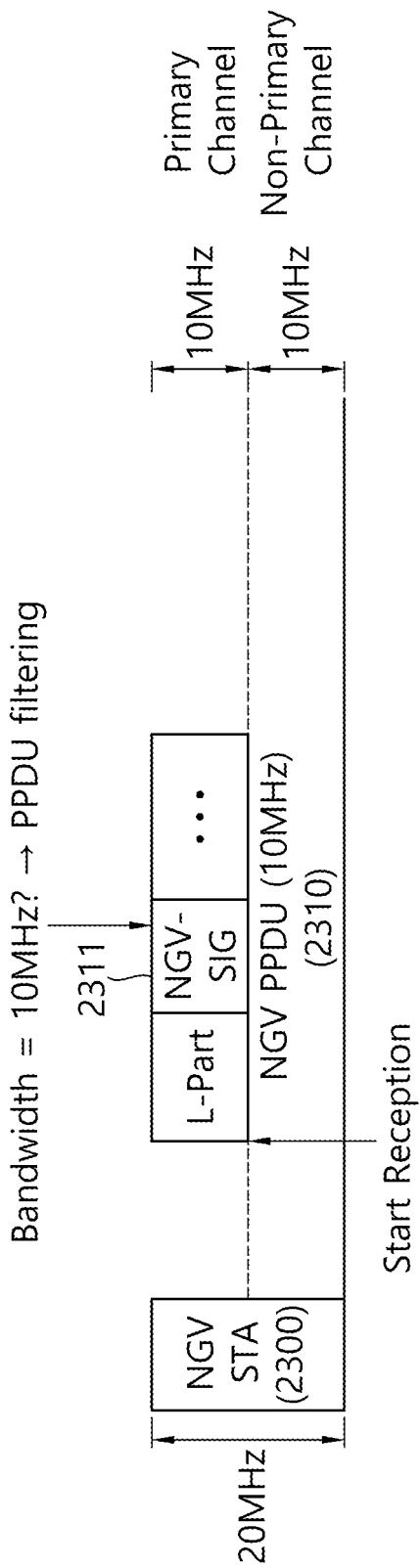
FIG. 23 shows a diagram for explaining an example in which NGV PPDUs are filtered.

The format of the NGV PPDU shown in FIGS. 23 and/or 24 is exemplary and the present specification is not limited thereto. For example, in the NGV PPDU shown in FIGS. 23 and/or 24, a repeated Non-HT SIGNAL (RL-SIG) may be further included between the L-Part and the NGV-SIG. For another example, the NGV PPDU shown in FIGS. 23 and/or 24 may be related to the NGV PPDU 2100 shown in FIG. 21.

Figure 24:
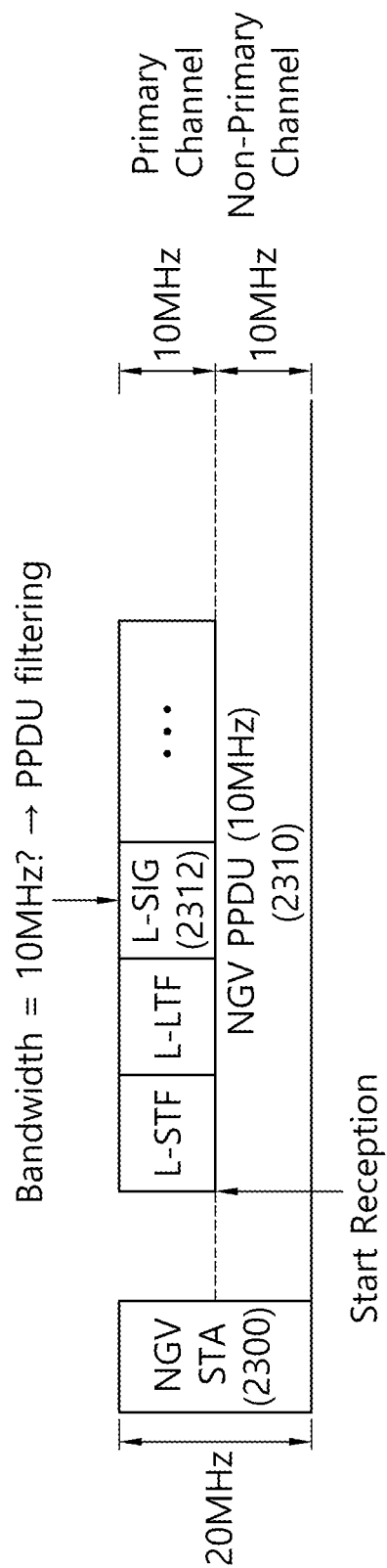
FIG. 24 shows a diagram for explaining another example in which the NGV PPDU is filtered.

In FIGS. 23 and 24, for convenience of description, it may be assumed that the NGV STA needs to transmit and receive an NGV PPDU of a 20 MHz bandwidth. That is, the NGV STA may filter the NGV PPDU of the 10 MHz bandwidth. Examples of this can be described in FIGS. 23 and 24.

FIG. 23 is a diagram for explaining an example in which NGV PPDUs are filtered.

Referring to FIG. 23, the NGV STA 2300 may be configured to transmit/receive an NGV PPDU having a 20 MHz bandwidth. Accordingly, the NGV STA 2300 may be configured to filter the NGV PPDU of a 10 MHz bandwidth. The NGV STA 2300 may transmit and receive signals through a 10 MHz primary channel and a 10 MHz non-primary channel.

According to an embodiment, the NGV STA 2300 may receive the NGV PPDU 2310. For example, the NGV STA 2300 may receive the NGV PPDU 2310 through the primary channel. As an example, the NGV PPDU 2310 may be configured with a 10 MHz bandwidth.

According to an embodiment, the NGV STA 2300 may identify the NGV-SIG 2311 of the NGV PPDU 2310. In other words, the NGV STA 2300 may decode the NGV-SIG 2311 of the NGV PPDU 2310. The NGV-SIG 2311 may include information related to the bandwidth of the NGV PPDU 2310. Accordingly, the NGV-SIG 2311 may include information indicating that the bandwidth of the NGV PPDU 2310 is 10 MHz. The NGV STA 2300 may identify that the bandwidth of the NGV PPDU 2310 is 10 MHz.

According to an embodiment, the NGV STA 2300 may stop decoding the NGV PPDU 2310 based on the bandwidth of the NGV PPDU 2310 being 10 MHz. Also, the NGV STA 2300 may filter the NGV PPDU 2310. The NGV STA 2300 may defer/delay channel access until the transmission of the NGV PPDU 2310 is finished based on information included in the L-SIG, for example, a length or a rate). In other words, the NGV STA 2300 may check the transmission length of the NGV PPDU 2310. The NGV STA 2300 may defer/delay channel access by the transmission length of the NGV PPDU 2310.

Accordingly, the NGV STA 2300 may filter the NGV PPDU 2310 based on the NGV-SIG 2311.

FIG. 24 is a diagram for explaining another example in which the NGV PPDU is filtered.

Referring to FIG. 24, unlike FIG. 23, the NGV STA 2300 may identify the L-SIG 2312 of the NGV PPDU 2310. In other words, the NGV STA 2300 may decode the L-SIG 2312 of the NGV PPDU 2310. The L-SIG 2312 may include information related to the bandwidth of the NGV PPDU 2310. Accordingly, the L-SIG 2312 may include information indicating that the bandwidth of the NGV PPDU 2310 is 10 MHz. The NGV STA 2300 may identify that the bandwidth of the NGV PPDU 2310 is 10 MHz.

According to an embodiment, the NGV STA 2300 may stop decoding the NGV PPDU 2310 based on the bandwidth of the NGV PPDU 2310 being 10 MHz. Also, the NGV STA 2300 may filter the NGV PPDU 2310. Also, the NGV STA 2300 may check information related to the transmission length of the NGV PPDU 2310. The NGV STA 2300 may defer/delay channel access by the transmission length of the NGV PPDU 2310.

Accordingly, the NGV STA 2300 may filter the NGV PPDU 2310 based on the L-SIG 2312.

FIGS. 23 and 24 are related to an example in which information related to the bandwidth of the NGV PPDU 2310 is included in the NGV-SIG 2311 or the L-SIG 2312. However, the present specification is not limited thereto. Accordingly, FIGS. 23 and 24 are exemplary, and information related to the bandwidth may be included in various fields and may be indicated through various methods.

(2) When the NGV STA Receives the 11p PPDU

The NGV STA may be instructed to perform an operation (or service) in a 20 MHz bandwidth from an upper layer. Since the NGV STA operates in a 20 MHz bandwidth, the NGV STA can know that the NGV PPDU is a valid PPDU, not the 11p PPDU. In other words, the NGV STA may determine that the 11p PPDU configured with the 10 MHz bandwidth is an invalid PPDU. The NGV STA may determine that an NGV PPDU configured with a 20 MHz bandwidth is a valid PPDU.

The NGV STA operating at 20 MHz may determine whether to filter a PPDU being received based on whether the PPDU being received through a primary channel is an NGV PPDU or an 11p PPDU. That is, when the NGV STA recognizes that the PPDU being received through the 10 MHz primary channel is an 11p PPDU, the NGV STA may filter the received PPDU. In this case, the NGV STA may defer/delay channel access until the transmission of the 11p PPDU is finished based on information included in the L-SIG, for example, a length or a rate.

The NGV STA may perform a PHY receive procedure (or detecting or decoding) of a new NGV PPDU again. For example, the NGV STA may perform a Clear Channel Assessment-Signal Detection (CCA-SD) procedure again. The CCA-SD procedure may be a procedure for detecting the start of a PPDU occupying a 10 MHz primary channel.

The NGV STA may perform the steps shown in FIG. 25 when filtering the 11p PPDU. A detailed description of the steps shown in FIG. 25 may be described later.

According to an embodiment, the 11p PPDU and the NGV PPDU may be distinguished through various methods.

For example, the 11p PPDU and the NGV PPDU may be distinguished based on a symbol containing a specific constellation (e.g., Q-BPSK) after the L-SIG. In other words, the NGV STA may identify the constellation of the symbol being contiguous to the L-SIG. As an example, the NGV STA may confirm/check that the received PPDU is an NGV PPDU based on the constellation of the symbol following the L-SIG being Q-BPSK. As another example, the NGV STA may confirm that the received PPDU is an NGV PPDU based on the BPSK constellation of the symbol following the L-SIG.

For another example, the 11p PPDU and the NGV PPDU may be distinguished based on whether the RL-SIG repeats the L-SIG after the L-SIG. In other words, the NGV STA may distinguish the 11p PPDU and the NGV PPDU based on the RL-SIG being contiguous to the L-SIG. As an example, the NGV STA may confirm that the received PPDU includes the RL-SIG. The RL-SIG may be contiguous to the L-SIG. The NGV STA may confirm that the received PPDU is an NGV PPDU based on the RL-SIG. As another example, the NGV STA may check that the received PPDU does not include the RL-SIG. The NGV STA may confirm that the received PPDU is an 11p PPDU based on that the RL-SIG is not included in the received PPDU.

An embodiment of classifying and filtering the 11p PPDU and the NGV PPDU in the above-described NGV STA may be described with reference to FIGS. 25 and 26.

Figure 26:
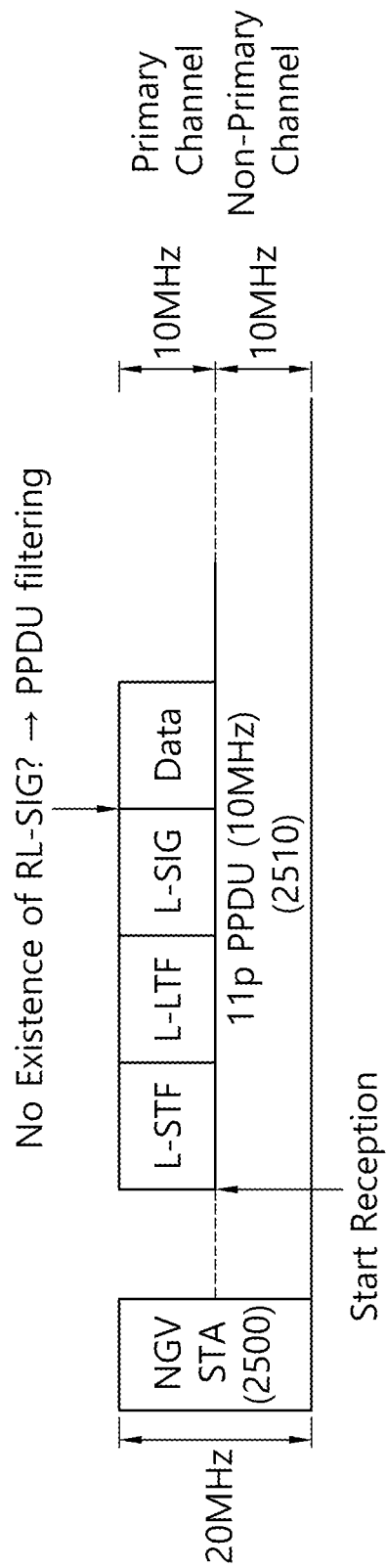
FIG. 26 shows a diagram for explaining another example in which an 11p PPDU is filtered.

In FIGS. 25 and 26, for convenience of description, it may be assumed that the NGV STA needs to transmit and receive an NGV PPDU. That is, the NGV STA may filter the 11p PPDU having a 10 MHz bandwidth.

FIG. 25 is a diagram for explaining an example in which an 11p PPDU is filtered.

Referring to FIG. 25, the NGV STA 2500 may be configured to transmit and receive an NGV PPDU. Accordingly, the NGV STA 2500 may be configured to filter the 11p PPDU. The NGV STA 2500 may transmit and receive signals through a 10 MHz primary channel and a 10 MHz non-primary channel.

According to an embodiment, the NGV STA 2500 may receive the 11p PPDU 2510. For example, the NGV STA 2500 may receive the 11p PPDU 2510 through the primary channel. The 11p PPDU 2510 may be configured with a 10 MHz bandwidth.

According to an embodiment, the NGV STA 2500 may identify the constellation of the One_OFDM_Symbol 2511 of the 11p PPDU 2510. For example, One_OFDM_Symbol 2511 may be contiguous to the L-Part. As an example, the One_OFDM_Symbol 2511 may be continuous to the L-SIG included in the L-Part.

Based on the One_OFDM_Symbol 2511, the NGV STA 2500 may confirm/check whether the received PPDU is a PPDU (i.e., 11p PPDU) format configured based on the 802.11p standard or a PPDU (i.e., NGV PPDU) format configured based on the 802.11bd standard.

For example, the NGV STA 2500 may confirm/check that the 11p PPDU 2510 is a PPDU configured based on the 802.11p standard based on the constellation of the One_OFDM_Symbol 2511. As an example, the NGV STA 2500 may confirm that the constellation of the One_OFDM_Symbol 2511 is not Q-BPSK. That is, the NGV STA 2500 may confirm that the 11p PPDU 2510 is not in the form of an NGV PPDU. Accordingly, the NGV STA 2500 may stop decoding the 11p PPDU 2510. Accordingly, the NGV STA 2500 may filter the 11p PPDU 2510.

The NGV STA 2500 may defer/delay channel access until the transmission of the 11p PPDU 2510 is finished based on information included in the L-SIG, for example, a length or a rate. In other words, the NGV STA 2500 may check the transmission length of the 11p PPDU 2510. The NGV STA 2500 may defer channel access by the transmission length of the 11p PPDU 2510.

Accordingly, the NGV STA 2500 may filter the 11p PPDU 2510 based on the One_OFDM_Symbol 2511.

FIG. 26 is a diagram for explaining another example in which an 11p PPDU is filtered.

Referring to FIG. 26, unlike FIG. 25, the NGV STA 2500 may identify whether the RL-SIG of the 11p PPDU 2510 is present. For example, a PPDU format being configured based on the 802.11bd standard may include the RL-SIG. A PPDU format according to the 802.11p standard may not include the RL-SIG. Accordingly, the NGV STA 2500 may classify/distinguish a PPDU format being configured based on the 802.11p standard and a PPDU format being configured based on the 802.11bd standard based on whether the RL-SIG is present.

According to an embodiment, the NGV STA 2500 may check/confirm that the 11p PPDU 2510 is a PPDU format configured based on the 802.11p standard based on the 11p PPDU 2510 does not include the RL-SIG. The NGV STA 2500 may stop decoding the 11p PPDU 2510. Also, the NGV STA 2500 may filter the 11p PPDU 2510. Also, the NGV STA 2500 may check information related to the transmission length of the 11p PPDU 2510. The NGV STA 2500 may defer/delay channel access by the transmission length of the 11p PPDU 2510.

Accordingly, the NGV STA 2500 may filter the 11p PPDU 2510 based on the presence or absence of the RL-SIG.

FIGS. 25 and 26 illustrate an example of filtering the 11p PPDU 2510 based on the constellation of the One_OFDM_Symbol 2511 or the presence (or absence) of RL-SIG, but the present speciation is not limited thereto. The filtering methods of FIGS. 25 and 26 are exemplary, and the NGV STA 2500 may distinguish the 11p PPDU and the NGV PPDU based on various methods.

Figure 27:
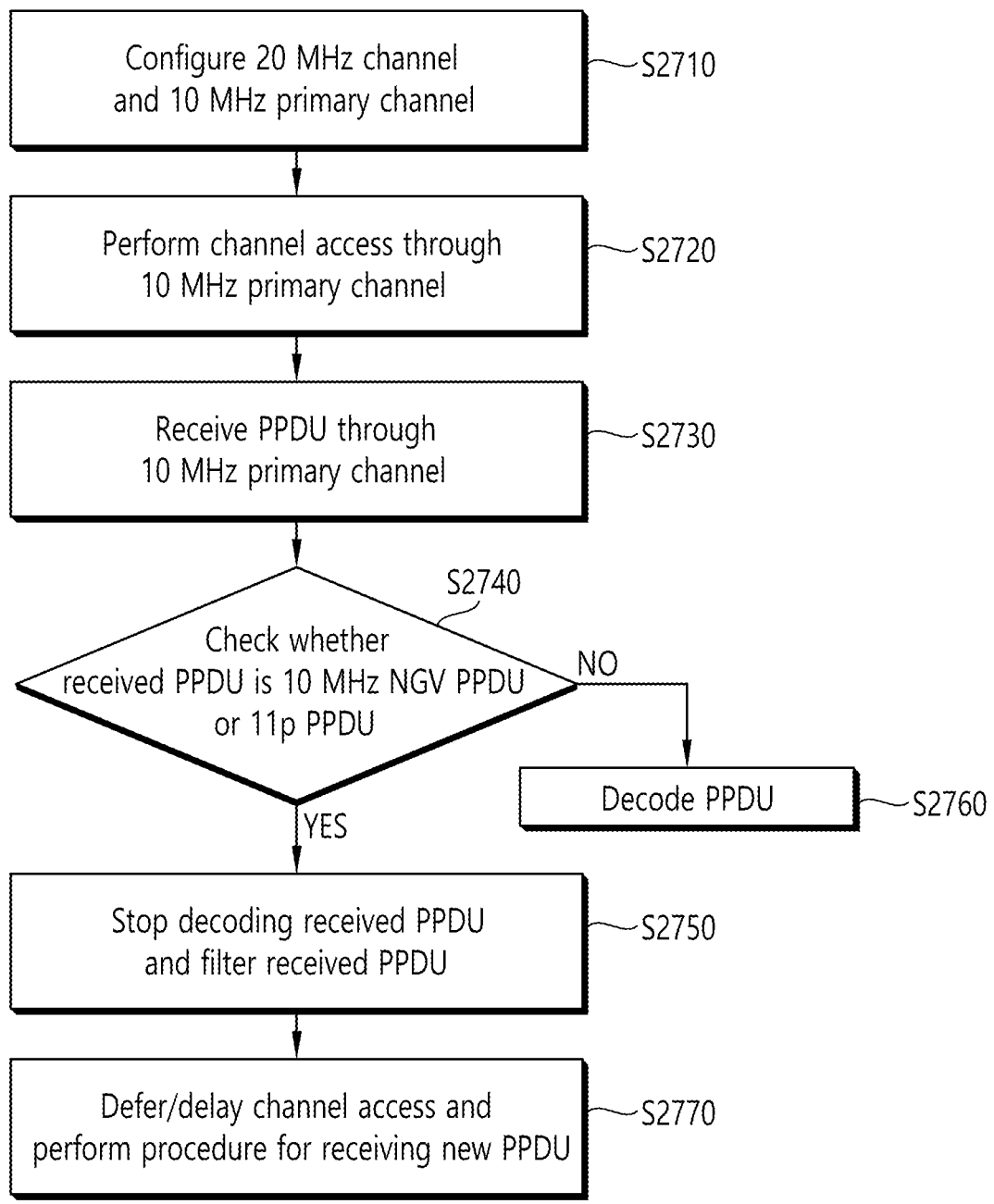
FIG. 27 shows a flowchart illustrating an operation of an NGV STA for filtering a PPDU.

FIG. 27 describes a flowchart of an operation of an NGV STA (e.g., NGV STAs 2300, 2500) for performing the above-described embodiments. For example, when it is decided to filter the PPDU being received by the NGV STA, the physical layer may issue PHY-RXEND.indication (Filtered) primitive.

FIG. 27 is a flowchart illustrating an operation of an NGV STA for filtering a PPDU.

Referring to FIG. 27, in step S2710, the NGV STA may configure a 20 MHz channel and a 10 MHz primary channel. According to an embodiment, the NGV STA may receive channel information from an upper layer. The information related to the channel may include information for configuring a 20 MHz channel and a 10 MHz primary channel.

The NGV STA may receive information related to a service to be performed from a higher layer. NGV STA may confirm/check to perform a service of 20 MHz bandwidth. For example, the NGV STA may need to transmit and receive an NGV PPDU having a 20 MHz bandwidth.

In step S2720, the NGV STA may perform channel access through a 10 MHz primary channel. For example, the NGV STA may perform a backoff operation on the 10 MHz primary channel based on CCA (or CCA/EDCA).

In step S2730, the NGV STA may receive a PPDU through a 10 MHz primary channel. For example, the NGV STA may receive at least a portion of the PPDU through a 10 MHz primary channel and decode at least the corresponding portion.

According to an embodiment, at least a portion of the 20 MHz NGV PPDU (e.g., L-STF, L-LTF, L-SIG, RL-SIG, NGV-SIG, or RNGV-SIG) is configured by being duplicated in units of 10 MHz. Therefore, even when receiving the 20 MHz NGV PPDU, the NGV STA may first receive at least a portion of the 20 MHz NGV PPDU through the 10 MHz primary channel and decode the received portion of the 20 MHz NGV PPDU. Thereafter, the NGV STA may decode the data of the 20 MHz NGV PPDU. Accordingly, the NGV STA may receive at least a portion of the PPDU through the 10 MHz primary channel and check the format of the received PPDU based on the received portion of the PPDU.

In step S2740, the NGV STA may check whether the received PPDU is a 10 MHz NGV PPDU or an 11p PPDU.

According to an embodiment, the NGV STA may check whether the received PPDU is an 11p PPDU. For example, the NGV STA may check whether the received PPDU is an 11p PPDU based on the OFDM symbol following the L-SIG field of the received PPDU. For example, the NGV STA may confirm/check that the received PPDU is an 11p PPDU based on that the constellation of the OFDM symbol following the L-SIG field is not Q-BPSK. As another example, the NGV STA may check whether the received PPDU is an 11p PPDU based on the presence of an RL-SIG in the received PPDU. For example, the NGV STA may confirm that the received PPDU is an 11p PPDU based on the absence of an RL-SIG in the received PPDU. In other words, the NGV STA may check whether the L-SIG is repeated after the L-SIG. The NGV STA may confirm that the received PPDU is an 11p PPDU based on that the L-SIG is not repeated after the L-SIG.

According to an embodiment, the NGV STA may check whether the received PPDU is an NGV PPDU of 10 MHz bandwidth. For example, the NGV STA may first check whether the received PPDU is an NGV PPDU. Thereafter, the NGV STA may check whether the received PPDU is an NGV PPDU having a 10 MHz bandwidth.

For example, the NGV STA may check whether the received PPDU is an NGV PPDU having a bandwidth of 10

MHz based on information related to the bandwidth included in the received PPDU. For example, the NGV-SIG of the received PPDU may include information related to the bandwidth of the PPDU. The NGV STA may confirm/check that the bandwidth of the received PPDU is 10 MHz based on the NGV-SIG. The NGV STA may confirm that the received PPDU is an NGV PPDU of 10 MHz bandwidth. As another example, the L-SIG of the received PPDU may include information related to the bandwidth of the PPDU. The NGV STA may confirm that the bandwidth of the received PPDU is 10 MHz based on the L-SIG.

In step S2750, if the received PPDU is a 10 MHz NGV PPDU or an 11p PPDU, the NGV STA may stop decoding the received PPDU and filter the received PPDU. For example, the physical layer of the NGV STA may issue PHY-RXEND.indication (Filtered) primitive.

In step S2760, when the received PPDU is not an NGV PPDU or 11p PPDU of 10 MHz bandwidth, the NGV STA may decode the received PPDU. For example, the NGV STA may continuously decode the received PPDU based on the received PPDU being an NGV PPDU having a 20 MHz bandwidth.

In step S2770, the NGV STA may defer/delay channel access and perform a procedure for receiving a new PPDU.

According to an embodiment, the NGV STA may defer/delay channel access by the transmission time of the received PPDU. The NGV STA may check the L-SIG of the received PPDU. The L-SIG field may include a length field and a rate field. The NGV STA may obtain information related to the transmission time of the received PPDU based on the length field and the rate field. In other words, the received PPDU may include information related to the transmission time. Thereafter, the NGV STA may delay channel access by the transmission time of the received PPDU. In other words, the NGV STA may defer/delay channel access until transmission of the received PPDU is finished.

According to an embodiment, the NGV STA may perform a procedure for receiving a new PPDU. For example, the NGV STA may perform a Clear Channel Assessment-Signal Detection (CCA-SD) procedure again. The CCA-SD procedure may be a procedure for detecting the start of a PPDU occupying a 10 MHz primary channel.

2. An Embodiment of Filtering PPDUs Based on Service-Related Information

The NGV STA may be instructed with information related to an operation bandwidth (i.e., 10 MHz or 20 MHz) from an upper layer and information related to a service capable of classifying the service. In other words, the NGV STA may receive bandwidth-related information and service-related information. The NGV STA may identify a service to be performed by the NGV STA based on the service-related information.

The NGV STA may receive the NGV PPDU. The NGV STA may compare the service it needs to perform with the service performed through the NGV PPDU. The NGV STA may filter the received NGV PPDU based on the comparison result.

For example, the NGV STA may receive first information related to a service from a higher layer. The NGV STA may receive the second information related to the service from the NGV PPDU. The NGV STA may compare the first information and the second information. The NGV STA may check whether the first service related to the first information and the second service related to the second information match. The NGV STA may filter the NGV STA when the first service and the second service do not match. The first information and the second information may be configured as follows.

Service ID (e.g., 0, 1 or 2, etc.)
Provider Service Identifier or PSID (i.e., a service identifier indicated in IEEE 1609 standard)
Compressed PSID (i.e., technical scheme classifying PSIDs while reducing the size of PSIDs)

That is, information related to the service may be indicated as described above. However, the present specification is not limited thereto. Information related to the service may be indicated through various methods.

According to an embodiment, the NGV STA may be instructed with a Service ID from a higher layer. In other words, the NGV STA may receive information related to the Service ID from a higher layer. The NGV STA may check the value of the Service ID (hereinafter, referred to as the first Service ID) received from the higher layer.

In addition, the NGV STA may obtain information related to the Service ID included in the received NGV PPDU. The NGV STA may check/confirm the value of the Service ID (hereinafter, referred to as the second Service ID) obtained through the NGV PPDU.

For example, the value of the first Service ID may be a first value (e.g., '0'). Also, the value of the second Service ID may be a first value (e.g., '0'). The NGV STA may continue to decode the received NGV PPDU based on that the value of the first Service ID and the value of the second Service ID are the same.

As another example, the value of the first Service ID may be the first value (e.g., '0'). Also, the value of the second Service ID may be a second value (e.g., '1'). The NGV STA may filter the received NGV PPDU based on the difference between the value of the first Service ID and the value of the second Service ID.

The above-described embodiment may provide a technical effect in which the NGV STA can obtain only service-related information and filter the received NGV PPDU. That is, the NGV STA may not decode the data field of the NGV PPDU not related to the service to be performed. Accordingly, there is an effect in which the NGV STA can operate efficiently.

Figure 29:
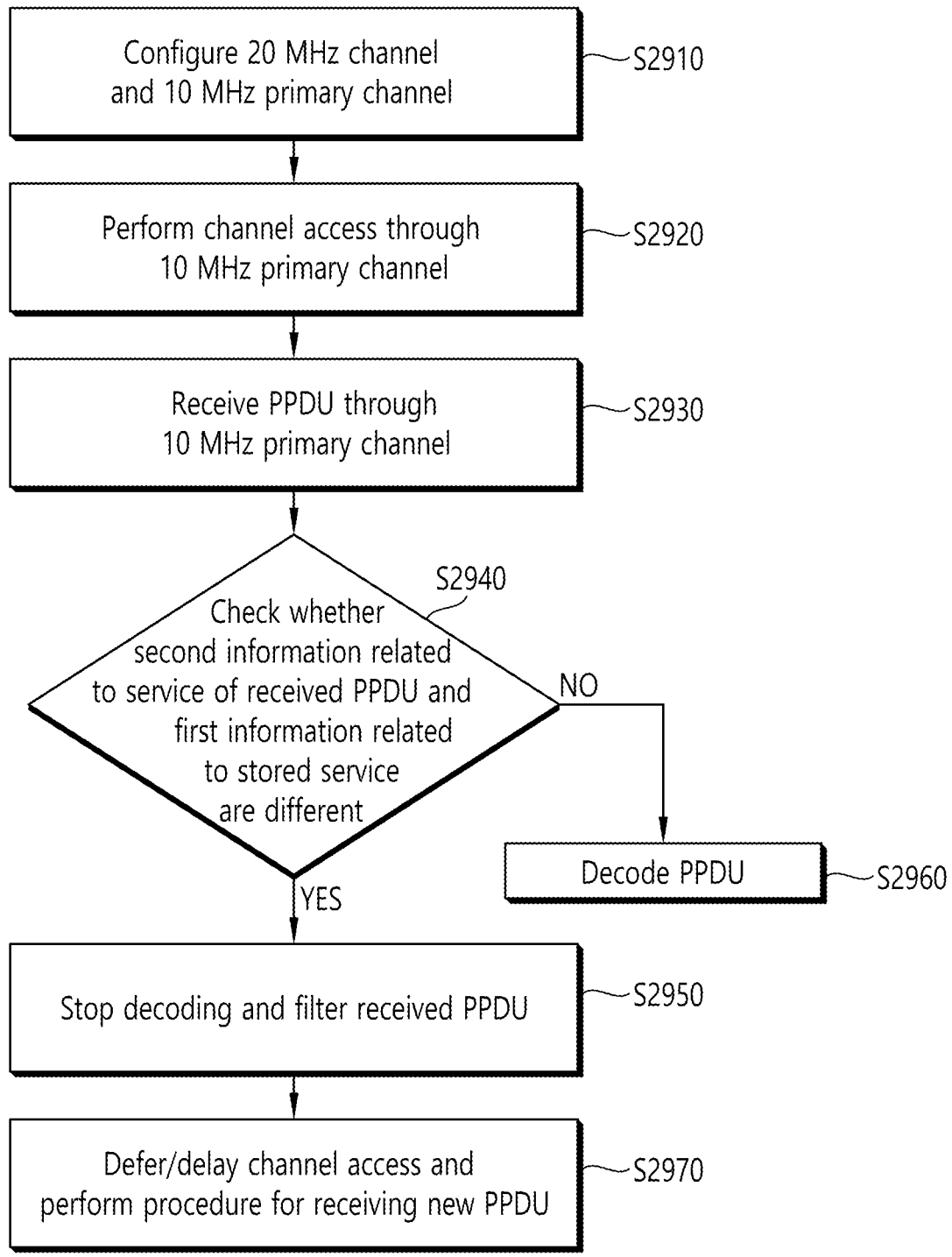
FIG. 29 shows a flowchart illustrating another operation of an NGV STA for filtering a PPDU.

According to an embodiment, when the NGV STA filters the NGV PPDU through the above-described embodiment, the steps shown in FIG. 29 may be performed. A detailed description of the steps shown in FIG. 29 may be described later.

Information related to the above-described service may be indicated through the NGV PPDU. For example, service information may be indicated through an NGV SIG, L-SIG, or MAC header included in the NGV PPDU.

In other words, the above-described service-related information may be included in the NGV PPDU. For example, the service information may be included in the NGV SIG, L-SIG, or MAC header included in the NGV PPDU.

Figure 28:
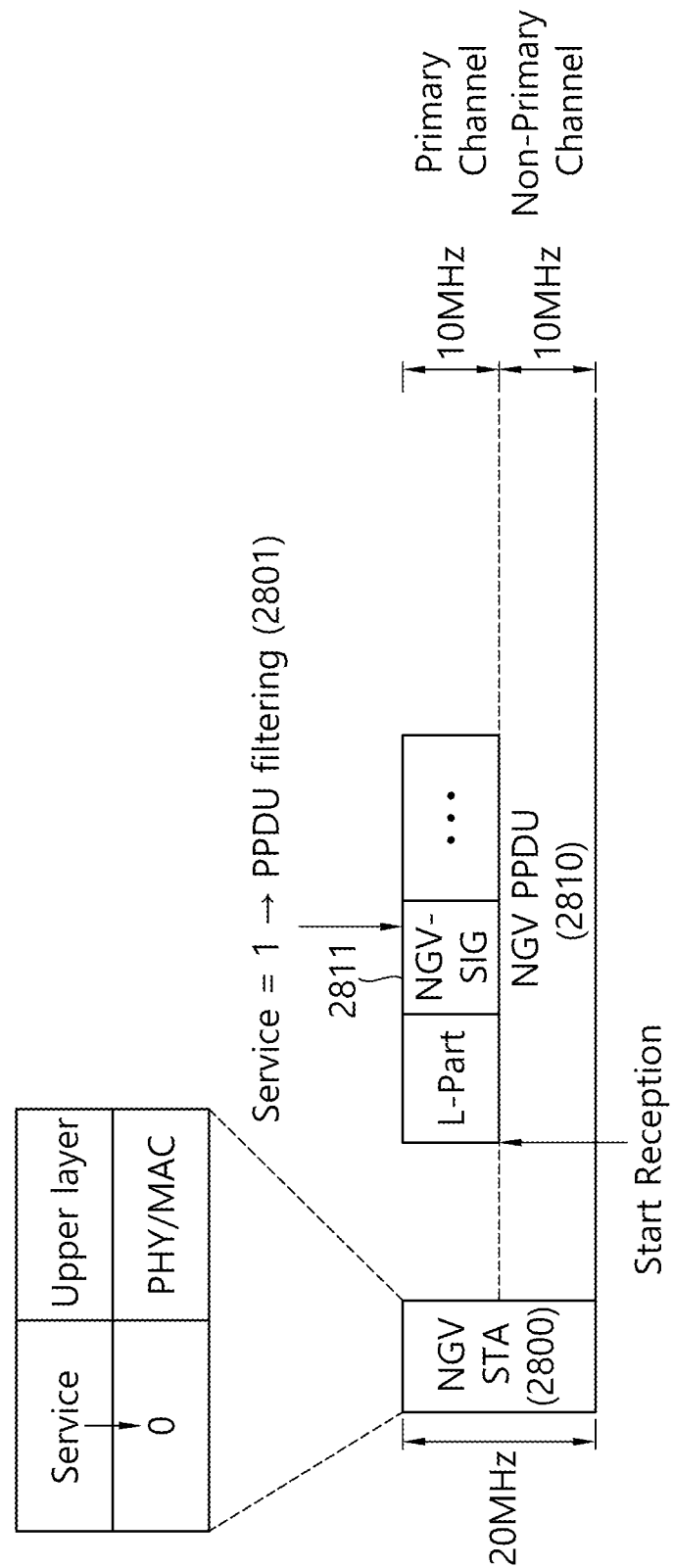
FIG. 28 shows a diagram for explaining an embodiment in which a PPDU is filtered based on service-related information.

A detailed operation of the NGV STA according to the above-described embodiment may be described with reference to FIG. 28. The format of the NGV PPDU shown in FIG. 28 is exemplary and not limited thereto. For example, in the NGV PPDU shown in FIG. 28, a repeated Non-HT SIGNAL (RL-SIG) may be further included between the L-Part and the NGV-SIG. For another example, the NGV PPDU shown in FIG. 28 may be related to the NGV PPDU 2100 shown in FIG. 21 or the NGV PPDU 2200 shown in FIG. 22.

In addition, information related to the service may be referred to as a service ID. However, the present specification is not limited thereto. The information related to the service may be set in various ways.

FIG. 28 is a diagram for explaining an embodiment in which a PPDU is filtered based on service-related information.

Referring to FIG. 28, the NGV STA 2800 may receive service-related information (hereinafter, first information) from a higher layer. For example, the upper layer may include a physical layer or a MAC layer. The first information may include a value of a Service ID (hereinafter, a first Service ID). For example, the value of the first Service ID may be set to a first value (e.g., '0'). Accordingly, the NGV STA 2800 may be configured to transmit and receive an NGV PPDU in which the value of the Service ID is set as the first value. The NGV STA may decode the data of the NGV PPDU in which the value of the Service ID is set as the first value. The NGV STA may filter the NGV PPDU in which the value of the Service ID is set as the second value.

The NGV STA 2300 may transmit and receive signals through a 10 MHz primary channel and a 10 MHz non-primary channel.

According to an embodiment, the NGV STA 2800 may receive the NGV PPDU 2810. For example, the NGV STA 2800 may receive the NGV PPDU 2810 through a primary channel.

According to an embodiment, the NGV STA 2800 may identify the NGV-SIG 2811 of the NGV PPDU 2810. The NGV-SIG 2811 may include service-related information (hereinafter, second information). The second information may include a value of a Service ID (hereinafter, a second Service ID). For example, the value of the second Service ID may be set to a second value (e.g., '1'). Accordingly, the NGV STA 2800 may stop decoding the NGV PPDU 2810 based on the difference between the value of the first Service ID and the value of the second Service ID. The NGV STA 2800 may filter the received NGV PPDU 2810. For example, the physical layer of the NGV STA 2800 may issue a PHY-RXEND.indication (Filtered) primitive.

For another example, although not shown, when the value of the second Service ID is set to the first value (e.g., '0'), the NGV STA 2800 may continue to decode the NGV PPDU 2810.

FIG. 28 shows an example of filtering by comparing values of Service IDs, but the present specification is not limited thereto. The filtering method of FIG. 28 is exemplary and thus not the present specification is not limited thereto. According to an embodiment, the NGV STA 2800 may perform filtering based on various information related to services. For example, the NGV STA 2800 may perform filtering based on a PSID or a compressed PSID.

FIG. 29, describes a flowchart of an operation performed by an NGV STA (e.g., NGV STA 2800) for performing the above-described embodiments. For example, when it is decided to filter the PPDU being received by the NGV STA, the Physical layer may issue PHY-RXEND.indication (Filtered) primitive.

FIG. 29 is a flowchart illustrating another operation of an NGV STA for filtering a PPDU.

Referring to FIG. 29, in step S2910, the NGV STA (e.g., the NGV STA 2800) may configure a 20 MHz channel and a 10 MHz primary channel. According to an embodiment, the NGV STA may receive channel information from an upper layer. The information related to the channel (i.e., the channel information) may include information for configuring a 20 MHz channel and a 10 MHz primary channel.

The NGV STA may receive first information related to a service from a higher layer. The NGV STA may store first information related to the service. For example, the first information related to the service may include a first Service ID value. The NGV STA may identify a service to be performed based on the first Service ID value. For example, the first Service ID value may be set to a first value (e.g., '0').

In step S2920, the NGV STA may perform channel access through a 10 MHz primary channel Step S2920 may be related to step S2720 of FIG. 27.

In step S2930, the NGV STA may receive a PPDU (e.g., an NGV PPDU) through a 10 MHz primary channel Step S2930 may be related to step S2730 of FIG. 27.

In step S2940, the NGV STA may check whether the second information related to the service of the received PPDU and the first information related to the stored service are different.

According to an embodiment, the NGV STA may obtain/confirm second information related to a service included in the received PPDU. The NGV STA may check the value of the second Service ID included in the second information related to the service. For example, the value of the second Service ID may be set to a second value (e.g., '1').

The NGV STA may check whether the value of the first Service ID included in the first information related to the service is different from the value of the second Service ID included in the second information related to the service.

In step S2950, the NGV STA may stop decoding the received PPDU based on the difference between the second information related to the service and the first information related to the service. The NGV STA may filter the received PPDU. Step S2950 may be related to step S2750 of FIG. 27.

In step S2960, the NGV STA may decode the received PPDU based on that the second information related to the service is identical (or matched) to the first information related to the service. Step S2960 may be related to step S2760 of FIG. 27.

In step S2970, the NGV STA may defer/delay channel access and perform a procedure for receiving a new PPDU. Step S2970 may be related to step S2770 of FIG. 27.

Figure 30:
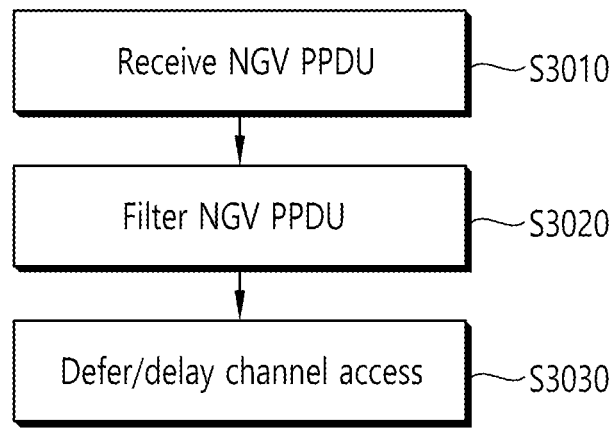
FIG. 30 shows a flowchart illustrating an operation of an STA for filtering a PPDU.

FIG. 30 is a flowchart illustrating an operation of an STA for filtering a PPDU.

Referring to FIG. 30, in step S3010, an STA (e.g., NGV STAs 2300, 2500, 2800) may receive an NGV PPDU.

According to an embodiment, the NGV PPDU may include a first control field and a second control field.

For example, the first control field may include first information related to the transmission time of the NGV PPDU. For example, the first information related to the transmission time of the NGV PPDU may include information related to the length of the NGV PPDU and information related to the rate of the NGV PPDU. The STA may obtain the first information related to the transmission time of the NGV PPDU based on the information related to the length of the NGV PPDU and the information related to the rate of the NGV PPDU. For example, the first information related to the transmission time of the NGV PPDU may include information related to a start time at which the transmission of the NGV PPDU begins and/or an end time at which the transmission of the NGV PPDU ends. As an example, the first control field may include an L-SIG (or an L-SIG field).

As another example, the second control field may include second information related to the bandwidth of the NGV PPDU. As an example, the second control field may include NGV-SIG (or NGV-SIG field).

According to an embodiment, the STA may check service related information before receiving the NGV PPDU. For example, the STA may receive and check service-related information from an upper layer. The service-related information may include third information related to a service-related bandwidth. The STA may identify a bandwidth for performing a service based on the third information.

According to an embodiment, the NGV PPDU may further include a third control field in which the first control field is repeated. For example, the third control field may be continuous to the first control field. The second control field may be continuous to the third control field. The STA may filter a PPDU having a format different from that of the NGV PPDU, based on the third control field. As an example, the STA may filter a PPDU having a format different from that of the NGV PPDU, based on whether the third control field is present. As an example, the STA may filter the 11p PPDU based on the absence of the third control field.

According to an embodiment, the STA may transmit/receive a signal through a 10 MHz primary channel and a 10 MHz non-primary channel. For example, the STA may receive the NGV PPDU (or at least a part of the NGV PPDU) through the 10 MHz primary channel.

In step S3020, the STA may filter the NGV PPDU. According to an embodiment, the STA may filter the NGV PPDU based on the second control field.

For example, the STA may check whether the second information is identical (or matched) to the third information. As an example, the STA may check whether the bandwidth for performing the service obtained based on the third information is identical (or matched) to the bandwidth of the NGV PPDU included in the second information.

For example, when the second information is not identical (or matched) to the third information, the STA may filter the NGV PPDU. For another example, when the second information is identical (or matched) to the third information, the STA may decode the NGV PPDU. For example, when the second information is identical (or matched) to the third information, the STA may decode data (or data field) of the NGV PPDU.

In step S3030, the STA may defer/delay channel access. According to an embodiment, the STA may defer/delay channel access based on the first control field. For example, the STA may check the first information regarding the transmission time of the NGV PPDU. Thereafter, the STA may defer/delay channel access by the transmission time of the NGV PPDU. In other words, the STA may defer/delay channel access until transmission of the received PPDU is finished.

According to an embodiment, the STA may perform a procedure for receiving a new PPDU. For example, the STA may perform a Clear Channel Assessment-Signal Detection (CCA-SD) procedure again. The CCA-SD procedure may be a procedure for detecting the start of a PPDU occupying a 10 MHz primary channel.

The technical features of the present specification described above may be applied to various devices and methods. For example, the above-described technical features of the present specification may be performed/supported through the apparatus of FIGS. 1 and/or 19. For example, the technical features of the present specification described above may be applied only to a part of FIGS. 1 and/or 19. For example, the technical features of the present specification described above are implemented based on the processing chips 114 and 124 of FIG. 1, or implemented based on the processors 111 and 121 and the memories 112 and 122 of FIG. 1, or, may be implemented based on the processor 610 and the memory 620 of FIG. 19. For example, an apparatus herein may include a memory and a processor operatively coupled to the memory, and the processor may be configured to obtain an NGV Physical Protocol Data Unit (PPDU). Further, the NGV The PPDU may include a first control field and a second control field, the first control field may include first information related to a transmission time of the NGV PPDU, and the second control field may include a second control field on a bandwidth of the NGV PPDU 2 information. The processor may be further configured to filter the NGV PPDU based on the second control field, and deferring channel access based on the first control field.

The technical features of the present specification may be implemented based on computer readable medium (CRM). For example, the CRM proposed by the present specification may obtain an NGV PPDU (Physical Protocol Data Unit). Further, the NGV PPDU may include a first control field and a second control field, and the first control field may be the NGV including first information related to a transmission time of the PPDU, and the second control field may include second information related to a bandwidth of the NGV PPDU. The CRM may be further configured to filter the NGV PPDU based on the second control field; and delay channel access based on the first control field. The instructions stored in the CRM of the present specification may be executed by at least one processor. At least one processor related to CRM in the present specification may be the processors 111 and 121 or the processing chips 114 and 124 of FIG. 1, or the processor 610 of FIG. 19. Meanwhile, the CRM of the present specification may be the memories 112 and 122 of FIG. 1, the memory 620 of FIG. 19, or a separate external memory/storage medium/disk.

The above-described technical characteristics of the present specification may be applied to various applications or business models. For example, the UE, Terminal, STA, Transmitter, Receiver, Processor, and/or Transceiver, and so on, that are described in the present specification may be applied to vehicles that support autonomous driving or prior art vehicles that support autonomous driving.

Figure 31:
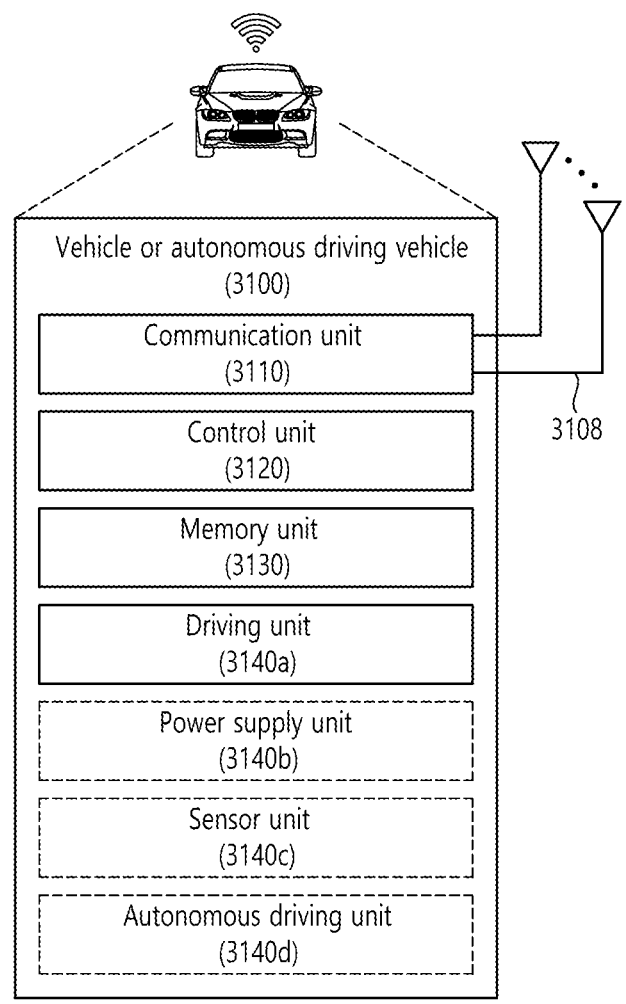
FIG. 31 shows a vehicle or an autonomous driving vehicle applied to the present specification.

FIG. 31 shows a vehicle or an autonomous driving vehicle applied to the present specification. The vehicle or autonomous driving vehicle may be implemented by a mobile robot, a car, a train, a manned/unmanned Aerial Vehicle (AV), a ship, and so on.

A memory unit 3130 shown in FIG. 31 may be included in the memory(s) 112, 122 shown in FIG. 1. Additionally, a communication unit 3110 shown in FIG. 31 may be include in the transceiver(s) 113, 123 and/or processor(s) 111, 121 shown in FIG. 1. Furthermore, the remaining devices that are shown in FIG. 31 may be included in the processor(s) 111, 121 shown in FIG. 1.

Referring to FIG. 31, a vehicle or autonomous driving vehicle 3100 may include an antenna unit 3108, a communication unit 3110, a control unit 3120, a memory unit 3130, a driving unit 3140a, a power supply unit 3140b, a sensor unit 3140c, and/or an autonomous driving unit 3140d. The antenna unit 3108 may be configured as a part of the communication unit 3110.

The communication unit 3110 may transmit and receive signals (e.g., data and control signals) to and from external devices such as other vehicles, BSs (e.g., gNBs and road side units), and servers. The control unit 3120 may perform various operations by controlling elements of the vehicle or the autonomous driving vehicle 3100. The control unit 3120 may include an Electronic Control Unit (ECU). The driving unit 3140a may cause the vehicle or the autonomous driving vehicle 3100 to drive on a road. The driving unit 3140a may include an engine, a motor, a powertrain, a wheel, a brake, a steering device, and so on. The power supply unit 3140b may supply power to the vehicle or the autonomous driving vehicle 3100 and include a wired/wireless charging circuit, a battery, and so on. The sensor unit 3140c may acquire a vehicle state, ambient environment information, user information, and so on. The sensor unit 3140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 3140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 3110 may receive map data, traffic information data, and so on, from an external server. The autonomous driving unit 3140d may generate an autonomous driving path and a driving plan from the obtained data. The control unit 3120 may control the driving unit 3140a such that the vehicle or the autonomous driving vehicle 3100 may move along the autonomous driving path according to the driving plan (e.g., speed/direction control). In the middle of autonomous driving, the communication unit 3110 may aperiodically/periodically acquire recent traffic information data from the external server and acquire surrounding traffic information data from neighboring vehicles. In the middle of autonomous driving, the sensor unit 3140c may obtain a vehicle state and/or surrounding environment information. The autonomous driving unit 3140d may update the autonomous driving path and the driving plan based on the newly obtained data/information. The communication unit 3110 may transfer information related to a vehicle position, the autonomous driving path, and/or the driving plan to the external server. The external server may predict traffic information data using AI technology, and so on, based on the information collected from vehicles or autonomous driving vehicles and provide the predicted traffic information data to the vehicles or the autonomous driving vehicles.

An example of the present specification includes an example of FIG. 32, which will hereinafter be described in detail.

Figure 32:
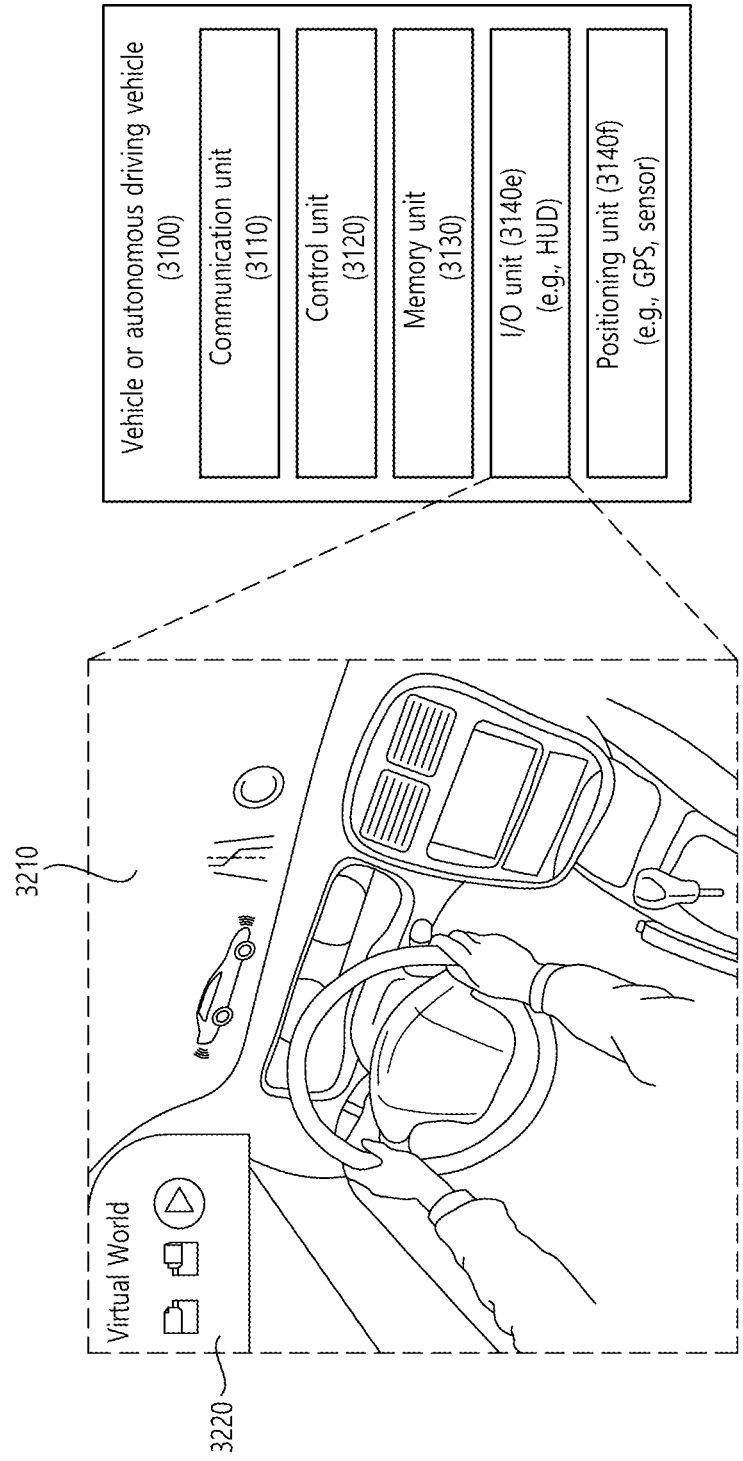
FIG. 32 shows an example of a vehicle that is applied to the present specification.

FIG. 32 shows an example of a vehicle that is applied to the present specification. The vehicle may be implemented as a transport means, an aerial vehicle, a ship, and so on.

Referring to FIG. 32, a vehicle 3100 may include a communication unit 3110, a control unit 3120, a memory unit 3130, an input/output (I/O) unit 3140e, and a positioning unit 3140f. Each block/unit/device shown in FIG. 32 may be the same as each block/unit/device shown in FIG. 31, respectively.

The communication unit 3110 may transmit and receive signals (e.g., data and control signals) to and from external devices such as other vehicles or BSs. The control unit 3120 may perform various operations by controlling constituent elements of the vehicle 3100. The memory unit 3130 may store data/parameters/programs/code/commands for supporting various functions of the vehicle 3100. The I/O unit 3140e may output an AR/VR object based on information within the memory unit 3130. The I/O unit 3140e may include a HUD. The positioning unit 3140f may acquire information related to the position of the vehicle 3100. The position information may include information related to an absolute position of the vehicle 3100, information related to the position of the vehicle 3100 within a traveling lane, acceleration information, and information related to the position of the vehicle 3100 from a neighboring vehicle. The positioning unit 3140f may include a GPS and various sensors.

As an example, the communication unit 3110 of the vehicle 3100 may receive map information and traffic information from an external server and store the received information in the memory unit 3130. The positioning unit 3140f may obtain the vehicle position information through the GPS and various sensors and store the obtained information in the memory unit 3130. The control unit 3120 may generate a virtual object based on the map information, traffic information, and vehicle position information and the I/O unit 3140e may display the generated virtual object in a window in the vehicle 3210, 3220. The control unit 3120 may determine whether the vehicle 3100 normally drives within a traveling lane, based on the vehicle position information. If the vehicle 3100 abnormally exits from the traveling lane, the control unit 3120 may display a warning on the window in the vehicle through the I/O unit 3140e. In addition, the control unit 3120 may broadcast a warning message regarding driving abnormity to neighboring vehicles through the communication unit 3110. According to situation, the control unit 3120 may transmit the vehicle position information and the information related to driving/vehicle abnormality to related organizations.

The foregoing technical features of this specification are applicable to various applications or business models.

For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function.

The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method performed by a station (STA) and comprising: receiving a Next Generation V2X (NGV) Physical Protocol Data Unit (PPDU), wherein the NGV PPDU includes a legacy signal (L-SIG) field, a repeated L-SIG (RL-SIG) field which is a repeat of the L-SIG field and is contiguous to the L-SIG field, an NGV signal (NGV-SIG) field which is contiguous to the RL-SIG field, a repeated NGV-SIG (RNGV-SIG) field which is a repeat of the NGV-SIG field and is contiguous to contiguous to the NGV-SIG field, an NGV Short Training Field (NGV-STF) which is contiguous to the RNGV-SIG field, an NGV Long Training Field (NGV-LTF) which is contiguous to the NGV-STF, a data field which is contiguous to the NGV-LTF, and a midamble which is configured in a same format as the NGV-LTF and is contiguous to the data field, wherein the L-SIG field includes a length field which is related to a duration of the NGV PPDU and a rate field which is related to a data rate of the NGV PPDU, wherein the NGV-SIG field includes a first field related to a physical version of the NGV PPDU, a second field related to a bandwidth of the NGV PPDU, a third field related to a Modulation and Coding Scheme (MCS) of the NGV PPDU, a fourth field related to a spatial stream of the NGV PPDU, fifth field related to a periodicity of the midamble, and a sixth field related to a format of the NGV-LTF, wherein the format of the NGV-LTF is set to one of an NGV-LTF-1× and an NGV-LTF-2×, wherein the NGV-LTF-1× is configured based on an NGV-LTF-1× sequence which is defined as $\{1, 0, 1, 0, -1, 0, 1, 0, -1, 0, -1, 0, 1, 0, 1, 0, 1, 0, -1, 0, 1, 0, 1, 0, 1, 0, 1, 0, 0, 0, -1, 0, 1, 0, -1, 0, -1, 0, -1, 0, -1, 0, -1, 0, 1, 0, -1, 0, -1, 0, -1, 0, 1, 0, 1, 0, -1\}$, wherein the NGV-LTF-2× is configured based on an NGV-LTF-2× sequence which is defined as $\{1, 1, 1, 1, -1, -1, 1, 1, -1, 1, -1, 1, 1, 1, 1, 1, 1, -1, -1, 1, 1, -1, 1, -1, 1, 1, 1, 1, 0, 1, -1, -1, 1, 1, -1, 1, -1, 1, -1, -1, -1, -1, -1, 1, 1, -1, -1, 1, -1, 1, -1, 1, 1, 1, 1, -1, -1\}$, filtering the NGV PPDU based on the NGV-SIG field; and deferring channel access based on the L-SIG field.

2. The method of claim 1, wherein the NGV PPDU is received through a 10 MHz primary channel.

3. A station (STA) in a wireless local area network (WLAN) system, the STA comprising: a transceiver configured to transmit and receive a wireless signal; and a processor coupled to the transceiver, wherein the processor is configured to: receive a Next Generation V2X (NGV) Physical Protocol Data Unit (PPDU), wherein the NGV PPDU includes a legacy signal (L-SIG) field, a repeated L-SIG (RL-SIG) field which is a repeat of the L-SIG field and is contiguous to the L-SIG field, an NGV signal (NGV-SIG) field which is contiguous to the RL-SIG field, a repeated NGV-SIG (RNGV-SIG) field which is a repeat of the NGV-SIG field and is contiguous to contiguous to the NGV-SIG field, an NGV Short Training Field (NGV-STF) which is contiguous to the RNGV-SIG field, an NGV Long Training Field (NGV-LTF) which is contiguous to the NGV-STF, a data field which is contiguous to the NGV-LTF, and a midamble which is configured in a same format as the NGV-LTF and is contiguous to the data field, wherein the L-SIG field includes a length field which is related to a duration of the NGV PPDU and a rate field which is related to a data rate of the NGV PPDU, wherein the NGV-SIG field includes a first field related to a physical version of the NGV PPDU, a second field related to a bandwidth of the NGV PPDU, a third field related to a Modulation and Coding Scheme (MCS) of the NGV PPDU, a fourth field related to a spatial stream of the NGV PPDU, fifth field related to a periodicity of the midamble, and a sixth field related to a format of the NGV-LTF, wherein the format of the NGV-LTF is set to one of an NGV-LTF-1× and an NGV-LTF-2×,
  wherein the NGV-LTF-1× is configured based on an NGV-LTF-1× sequence which is defined as {1, 0, 1, 0, −1, 0, 1, 0, −1, 0, −1, 0, 1, 0, 1, 0, 1, 0, −1, 0, 1, 0, 1, 0, 1, 0, 1, 0, 0, 0, −1, 0, 1, 0, −1, 0, −1, 0, −1, 0, −1, 0, −1, 0, 1, 0, −1, 0, −1, 0, −1, 0, 1, 0, 1, 0, −1},
  wherein the NGV-LTF-2× is configured based on an NGV-LTF-2× sequence which is defined as {1, 1, 1, 1, −1, −1, 1, 1, −1, 1, −1, 1, 1, 1, 1, 1, 1, −1, −1, 1, 1, −1, 1, −1, 1, 1, 1, 0, 1, −1, −1, 1, 1, −1, 1, −1, 1, −1, −1, −1, −1, −1, 1, 1, −1, −1, 1, −1, 1, −1, 1, 1, 1, 1, −1, −1};
  filter the NGV PPDU based on the NGV-SIG field; and
  defer channel access based on the L-SIG field.

4. The STA of claim 3, wherein the NGV PPDU is received through a 10 MHz primary channel.

\* \* \* \* \*